United States Patent
Matsuda et al.

(10) Patent No.: US 10,978,945 B2
(45) Date of Patent: Apr. 13, 2021

(54) SEMICONDUCTOR DEVICE FOR SWITCHING POWER SUPPLY CONTROL AND AC-DC CONVERTER

(71) Applicants: Hiroki Matsuda, Zama (JP); Satoshi Arima, Isehara (JP)

(72) Inventors: Hiroki Matsuda, Zama (JP); Satoshi Arima, Isehara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 15 days.

(21) Appl. No.: 16/660,725

(22) Filed: Oct. 22, 2019

(65) Prior Publication Data

US 2020/0127571 A1    Apr. 23, 2020

(30) Foreign Application Priority Data

Oct. 23, 2018    (JP) .............................. JP2018-199392

(51) Int. Cl.
     *H02M 1/36*         (2007.01)
     *H02M 3/335*       (2006.01)
     (Continued)

(52) U.S. Cl.
     CPC ............... *H02M 1/36* (2013.01); *H02M 1/08* (2013.01); *H02M 1/32* (2013.01);
     (Continued)

(58) Field of Classification Search
     CPC . H02M 2001/0003; H02M 2001/0006; H02M 2001/0032; H02M 2001/0048; H02M 2001/0054; H02M 2001/0067; H02M 2001/007; H02M 1/08; H02M 1/088; H02M 1/32; H02M 1/36; H02M 3/335; H02M 3/33507; H02M 3/33523;
     (Continued)

(56) References Cited

U.S. PATENT DOCUMENTS 8,084,893 B2    12/2011   Fujii
9,407,153 B2    8/2016    Yamane
               (Continued)

FOREIGN PATENT DOCUMENTS

JP           5343393 B2     8/2013
JP          2014082831 A    5/2014

*Primary Examiner* — Alex Torres-Rivera
*Assistant Examiner* — David A. Singh
(74) *Attorney, Agent, or Firm* — Holtz, Holtz & Volek PC

(57) ABSTRACT

Disclosed is a semiconductor device for switching power supply control including: a power supply terminal; a current inflow terminal; a starting circuit; and a brownout detection circuit, wherein a control signal of a switching element is generated, the starting circuit includes: a first comparator; a starting control circuit which controls on and off of the switch; and an operation start circuit which detects that the voltage of the power supply terminal becomes equal to or more than a predetermined voltage, and generates a signal for operating an internal circuit, and the brownout detection circuit includes: a voltage divider; a second comparator which has a hysteresis characteristic for detecting generation of a brownout state; a timer circuit which measures a predetermined time during which the generation of the brownout state continues; and an output stop circuit which stops outputting of a switching control signal.

7 Claims, 14 Drawing Sheets

(51) Int. Cl.
  *H02M 1/08*   (2006.01)
  *H02M 1/32*   (2007.01)
  *H02M 1/00*   (2006.01)

(52) U.S. Cl.
  CPC .................. *H02M 3/33507* (2013.01); *H02M 2001/0006* (2013.01); *H02M 2001/0032* (2013.01); *H02M 2001/0054* (2013.01)

(58) Field of Classification Search
  CPC ......... H02M 3/33538; H02M 3/33546; H02M 3/33553; H02H 3/20; H02H 3/207; H02H 7/10; H02H 7/12; H02H 9/02; G01R 19/16538; G01R 31/40
  USPC .......................................................... 361/18
  See application file for complete search history.

(56) References Cited

U.S. PATENT DOCUMENTS

| | | | |
|---|---|---|---|
| 2009/0103338 A1* | 4/2009 | Nakamura | H02M 1/32 363/89 |
| 2009/0268488 A1* | 10/2009 | Fujii | H02M 1/32 363/49 |
| 2014/0104894 A1 | 4/2014 | Yamane | |
| 2015/0280585 A1* | 10/2015 | Hayakawa | H02M 3/33507 363/21.13 |
| 2015/0381056 A1* | 12/2015 | Hayakawa | H02M 3/33507 363/21.15 |
| 2017/0155316 A1* | 6/2017 | Fawaz | H02M 3/33523 |
| 2018/0034380 A1* | 2/2018 | Chen | H02M 1/32 |
| 2019/0207522 A1* | 7/2019 | Sato | H02M 1/08 |
| 2020/0127555 A1* | 4/2020 | Matsuda | H02M 1/36 |

* cited by examiner

FIG. 7
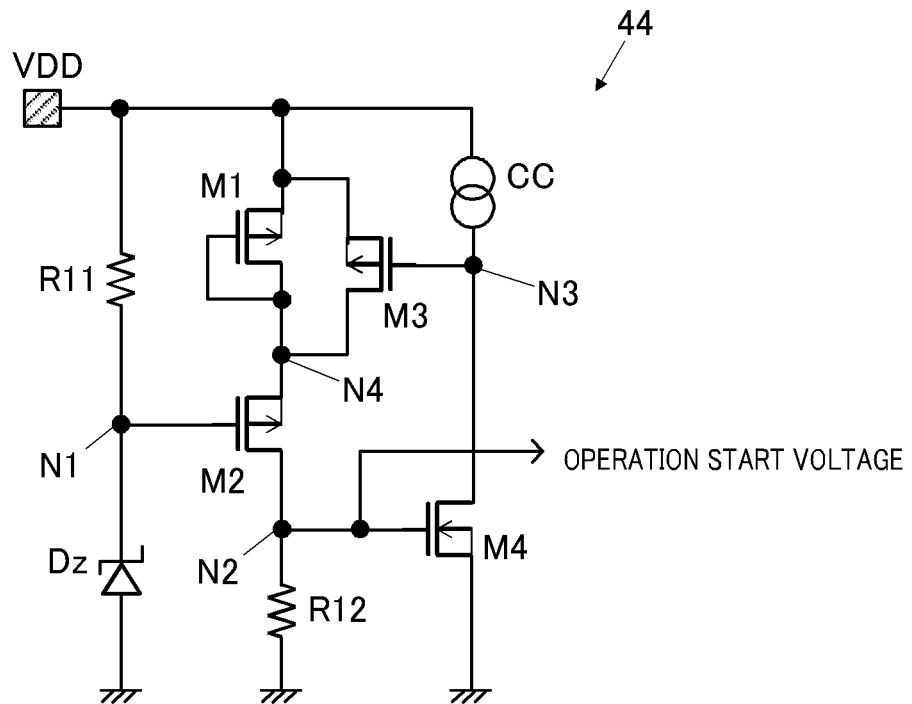
FIG. 8A
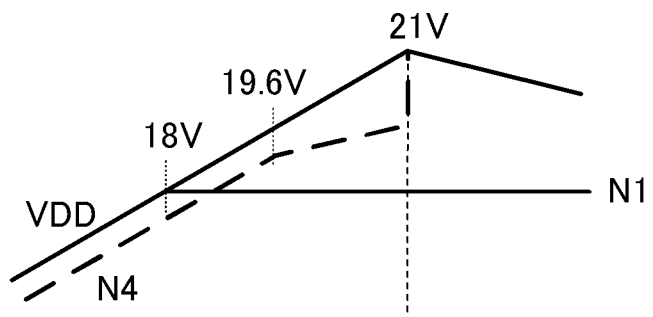
FIG. 8B
FIG. 8C
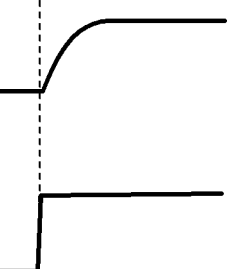

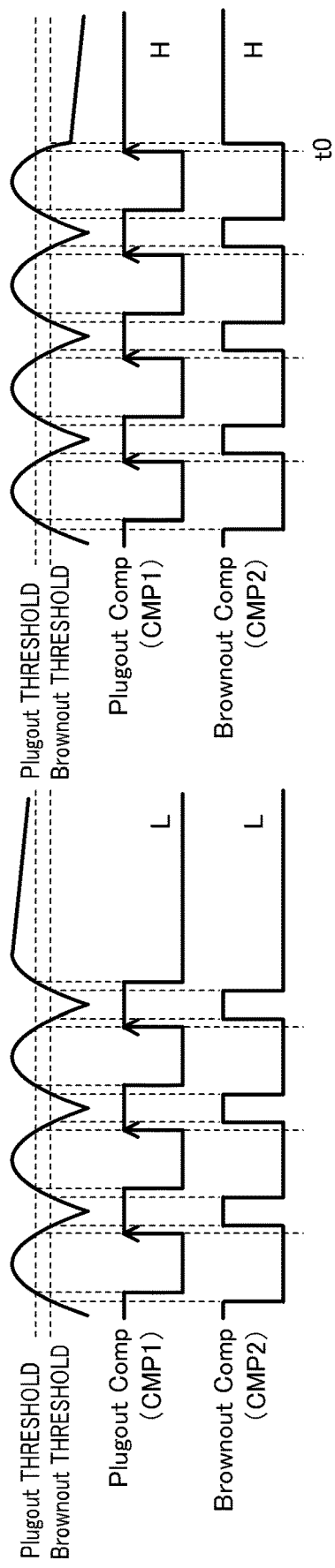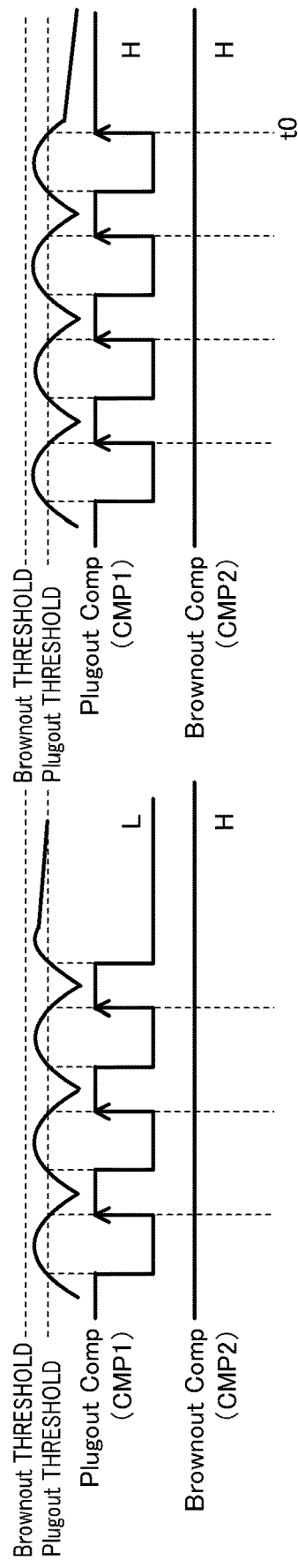

SEMICONDUCTOR DEVICE FOR SWITCHING POWER SUPPLY CONTROL AND AC-DC CONVERTER

CROSS-REFERENCE TO RELATED APPLICATION

This application is based upon and claims the benefit of priority from the prior Japanese Patent Application No. 2018-199392, filed on Oct. 23, 2018, the entire contents of which are incorporated herein by reference.

BACKGROUND

Technical Field

The present invention relates to a semiconductor device for power supply control, and particularly to a technique which is effectively used in a semiconductor device for primary-side control forming a switching power supply device provided with a transformer for voltage conversion, and in an AC-DC converter using the semiconductor device for primary-side control.

Background Art

Examples of the direct current power supply device include an isolated AC-DC converter which is configured by including a diode bridge circuit that rectifies an alternating current power supply, a DC-DC converter that reduces the direct current voltage rectified in the diode bridge circuit to convert the voltage into a direct current voltage of a desired electric potential and the like. As such an AC-DC converter, for example, there is known a switching power supply device that controls an electric current flowing in a primary-side winding wire by performing on/off drive of a switching element which is connected in series with the primary-side winding wire of a transformer for voltage conversion by the PWM (pulse width modulation) control method, the PFM (pulse frequency modulation) control method or the like, and controls the voltage induced in the secondary-side winding wire.

Among the AC-DC converters of switching control method, there is an AC-DC converter that is configured to use a transformer including an auxiliary winding wire, supply a voltage as a power supply voltage to a power supply control circuit (IC), the voltage being obtained by rectifying and smoothing the voltage induced in the auxiliary winding wire when an electric current flows intermittently in the primary-side winding wire. The AC-DC converter is configured to have a built-in internal power supply circuit which generates an operation voltage at the level appropriate for the internal circuit in the IC (see JP 2014-082831 A).

Among the semiconductor devices for power supply control forming the switching power supply devices, there is a semiconductor device that has a brownout detection function of detecting the brownout state in which the AC input voltage decreases to be equal to or less than a predetermined voltage continuously for a certain time or more, and stopping the switching control (JP 5343393 B2).

However, the semiconductor device for switching power supply control disclosed in JP 5343393 B2 includes a starting circuit and a comparator which detects the generation of the brownout state. By controlling the starting circuit to be in an off state to detect the brownout, a common terminal is used as the current inflow terminal to the starting circuit and the voltage detection terminal for detecting the brownout. Thus, the starting circuit is in an off state when the brownout detection function is to be effective, in order to detect the brownout without being influenced by the impedance from the input alternating current power supply line to the current inflow terminal.

That is, immediately after the power is input by inserting a plug or the like, a relatively large inflow current flows by the turning on of the starting circuit. However, an external resistor (limiting resistor) is connected to the current inflow terminal (high voltage starting terminal). Thus, if the current inflow terminal (high voltage starting terminal) to the starting circuit is used as the voltage detection terminal for detecting the brownout, due to the influence by the external resistor (limiting resistor) connected between the AC input terminal and the current inflow terminal, the current inflow terminal drops the voltage to the alternating current power supply (AC) to be lower than the alternating current voltage value which should be detected when a starting switch is turned on to allow the electric current flow. Thus, there is a concern that the voltage of the current inflow terminal becomes the brownout level and determined as the brownout by mistake, depending on the resistance value of the external resistor.

SUMMARY

An object of the present invention is to provide a semiconductor device for switching power supply control which can make the brownout detection function effective regardless of the on/off state of the starting circuit, and make the brownout detection function not effective and prevent wrong operations at the time of inputting the alternating current power supply, at the time of restarting for returning from the excessive load protecting operation or the like, and at the time of restarting for the change from the brownout to the brown-in.

Another object of the present invention is to provide a semiconductor device for switching power supply control which can start the operation of the internal circuit promptly by detecting the rising of the input voltage without using the comparator (voltage comparison circuit) which needs a reference voltage for comparing the voltages.

To achieve at least one of the abovementioned objects, according to an aspect of the present invention, there is provided a semiconductor device for switching power supply control including: a power supply terminal to which a voltage obtained by smoothing an induced voltage with an external capacitor is input, the induced voltage being a voltage induced in an auxiliary winding wire of a transformer which includes the auxiliary winding wire and in which a voltage obtained by rectifying an alternating current voltage is applied to a primary-side winding wire; a current inflow terminal to which the voltage obtained by rectifying the alternating current voltage is input via a resistor; a starting circuit which allows an electric current to flow to the power supply terminal via a switch and charges the capacitor, the switch being connected between the current inflow terminal and the power supply terminal; and a brownout detection circuit which is connected to the current inflow terminal and detects brownout, wherein a control signal of a switching element that is connected in series with the primary-side winding wire of the transformer is generated, the starting circuit includes: a first comparator to which a voltage of the power supply terminal is input and which has a first threshold and a second threshold that is lower than the first threshold; a starting control circuit which controls on and off of the switch based on an output of the first comparator; and an operation start circuit which detects that the voltage of the power supply terminal becomes equal to or more than a predetermined voltage that is higher than the first threshold without using a voltage to be compared, and which generates a signal for operating an internal circuit, and the brownout detection circuit includes: a voltage divider which divides a voltage of the current inflow terminal; a second comparator which has a hysteresis characteristic for detecting generation of a brownout state by comparing the voltage divided by the voltage divider and a predetermined voltage; a timer circuit to which an output of the second comparator and an output of the operation start circuit are input, and which measures a predetermined time during which the generation of the brownout state continues; and an output stop circuit which stops outputting of a switching control signal based on an output of the timer circuit.

Preferably, in the semiconductor device for switching power supply control, the starting circuit includes an operation stop circuit which detects that the voltage of the power supply terminal becomes equal to or less than a predetermined voltage that is lower than the second threshold and which generates a signal for stopping an operation of the internal circuit.

Preferably, the semiconductor device for switching power supply control includes: a first internal power supply circuit which generates a power supply voltage of a circuit forming the starting circuit and the brownout detection circuit based on the voltage of the power supply terminal; and a second internal power supply circuit which generates a power supply voltage of the internal circuit based on the voltage of the power supply terminal, wherein the operation of the internal circuit is stopped by stopping an operation of the second internal power supply circuit with the signal of the operation stop circuit.

Preferably, in the semiconductor device for switching power supply control, the output stop circuit outputs a signal of a first state of stopping the outputting of the switching control signal immediately after the voltage is applied to the current inflow terminal, and the output stop circuit outputs a signal of a second state different from the first state based on the output of the second comparator when the voltage of the current inflow terminal rises and the voltage divided by the voltage divider exceeds the predetermined voltage.

Preferably, in the semiconductor device for switching power supply control, the operation start circuit includes: a first resistor and a reverse-direction Zener diode which are connected in series between the power supply terminal and a constant potential point; and a first transistor, a second transistor and a second resistor in series, which are connected in parallel with the first resistor and the reverse-direction Zener diode, and the first transistor is diode-connected, a control terminal of the second transistor is connected to a connection node between the first resistor and the reverse-direction Zener diode, and the signal for operating the internal circuit is taken out from a connection node between the second transistor and the second resistor.

Preferably, in the semiconductor device for switching power supply control, the operation start circuit includes: a third transistor which is connected in parallel with the first transistor; and a constant current source and a fourth transistor which are connected in series between the power supply terminal and a constant potential point, a control terminal of the third transistor is connected to a connection node between the constant current source and the fourth transistor, and a control terminal of the fourth transistor is connected to a connection node between the second transistor and the second resistor.

According to another aspect of the present invention, there is provided an AC-DC converter including: the above semiconductor device for switching power supply control; a transformer which includes an auxiliary winding wire and in which a voltage obtained by rectifying an alternating current voltage is applied to a primary-side winding wire; and a switching element which is connected to the primary-side winding wire, wherein the switching element is controlled by using the semiconductor device for switching power supply control.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 7 is a circuit view showing a specific example of the operation start circuit forming the starting circuit;

FIGS. 8A to 8C are waveform diagrams showing a change in electric potential of the VDD terminal and changes in output of the operation start circuit;

FIGS. 14A to 14D are waveform diagrams showing four patterns of output state of a comparator for detecting the brownout generated according to the level of AC input and a comparator for detecting plug removal.

DESCRIPTION OF EMBODIMENTS

Hereinafter, a preferred embodiment of the present invention will be described with reference to the drawings.

Figure 1:
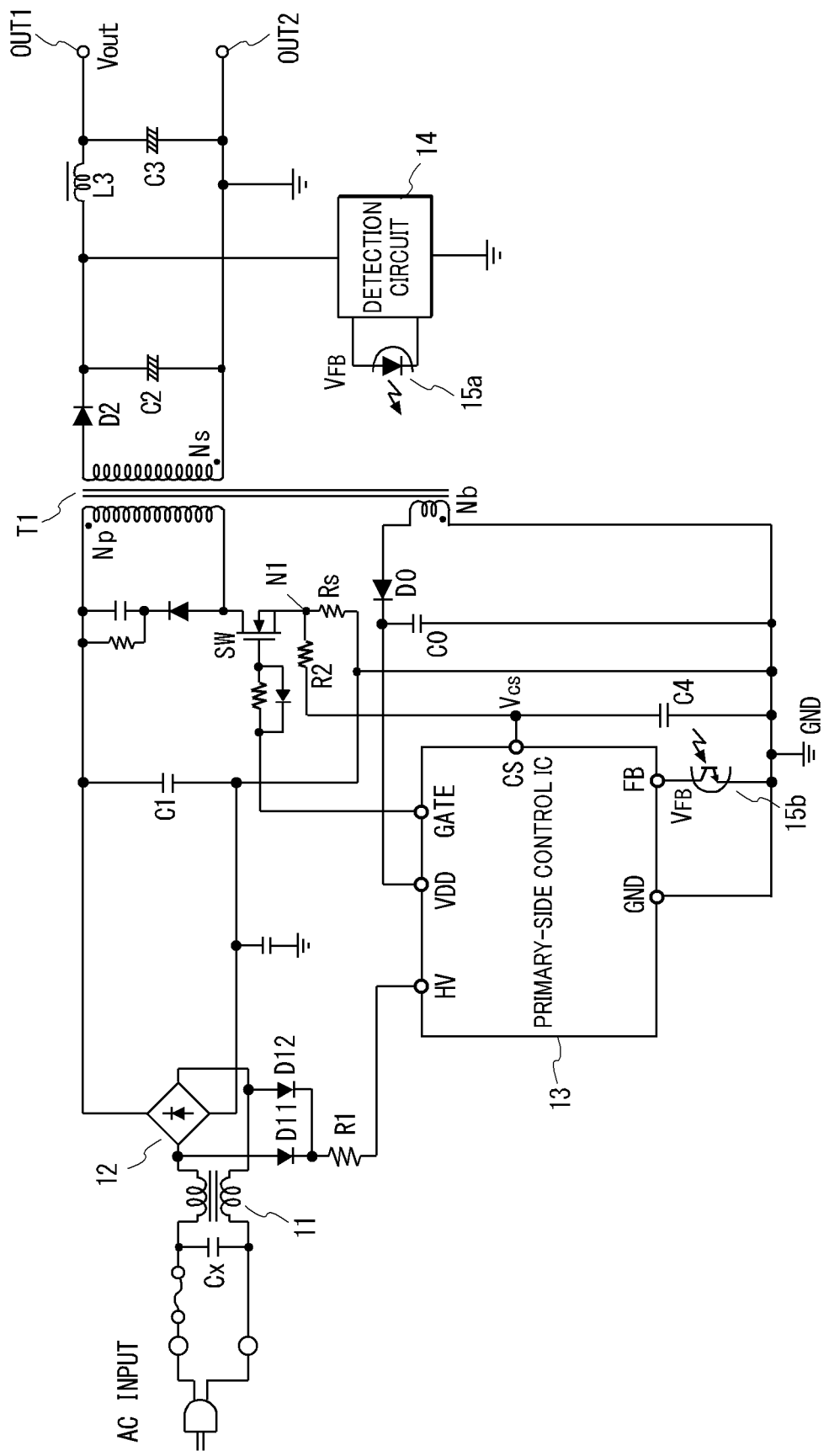
FIG. 1 is a circuit configuration view showing an embodiment of an AC-DC converter as an isolated direct current power supply device according to the present invention.

FIG. 1 is a circuit configuration view showing an embodiment of the AC-DC converter as an isolated direct current power supply device to which a switching power supply control semiconductor device according to the present invention is applied.

The AC-DC converter according to this embodiment includes: an X capacitor Cx connected between AC terminals for attenuating the normal-mode noise; a noise blocking filter 11 including a common-mode coil and the like; a diode bridge circuit 12 that rectifies an alternating current voltage (AC); a smoothing capacitor C1 that smooths the rectified voltage; a transformer T1 for voltage conversion including a primary-side winding wire Np, a secondary-side winding wire Ns, and an auxiliary winding wire Nb.

The AC-DC converter also includes: a switching transistor SW including an N-channel MOSFET connected in series with the primary-side winding wire Np of the transformer T1; and a switching power supply control semiconductor device 13 that drives the switching transistor SW. In this embodiment, the switching power supply control semiconductor device 13 is formed as a semiconductor integrated circuit (hereinafter referred to as a power supply control IC) on a single semiconductor chip such as a single-crystal silicon or the like.

On the secondary side of the transformer T1, a rectifying diode D2 connected in series with the secondary-side winding wire Ns and a smoothing capacitor C2 connected between a cathode terminal of this diode D2 and the other terminal of the secondary-side winding wire Ns are provided. By supplying an electric current intermittently to the primary-side winding wire Np, the alternating current voltage is induced in the secondary-side winding wire Ns, and by rectifying and smoothing this induced alternating current voltage, the direct current voltage Vout according to the winding wire ratio between the primary-side winding wire Np and the secondary-side winding wire Ns is output.

In addition, on the secondary side of the transformer T1, there are provided a coil L3 and a capacitor C3 that form a filter for blocking the switching ripple noise and the like occurring in the switching operation on the primary side, and there are also provided a detection circuit 14 for detecting the output voltage Vout and a photodiode 15a as a light emission-side element of a photocoupler which is connected to the detection circuit 14 and transmits a signal corresponding to the detected voltage to the power supply control IC 13. On the primary side, a phototransistor 15b is provided as a light reception-side element which is connected between a ground point and a feedback terminal FB of the power supply control IC 13 and receives a signal from the detection circuit 14.

On the primary side of the AC-DC converter according to this embodiment, there is provided a rectifying/smoothing circuit that includes a rectifying diode D0 connected in series with the auxiliary winding wire Nb, and a smoothing capacitor C0 connected between the ground point GND and a cathode terminal of the diode D0. The voltage rectified and smoothed in the rectifying/smoothing circuit is applied to a power supply voltage terminal VDD of the power supply control IC 13.

On the other hand, the power supply control IC 13 includes a high voltage input starting terminal HV to which the voltage before being rectified in the diode bridge circuit 12 is applied through diodes D11 and D12 and a resistor R1. The power supply control IC 13 is configured to operate by the voltage from this high voltage input starting terminal HV when the power is input (immediately after a plug is inserted into an outlet).

In addition, in the present embodiment, a resistor Rs for current detection is connected between the ground point GND and a source terminal of the switching transistor SW, and a resistor R2 is connected between a current detection terminal CS of the power supply control IC 13 and a connection node N1 between the switching transistor SW and the current detection resistor Rs. Furthermore, a capacitor C4 is connected between the ground point and the current detection terminal CS of the power supply control IC 13. The resistor R2 and the capacitor C4 form a low-pass filter.

Next, with reference to FIG. 2, a specific structure example of the power supply control IC 13 will be described.

Figure 2:
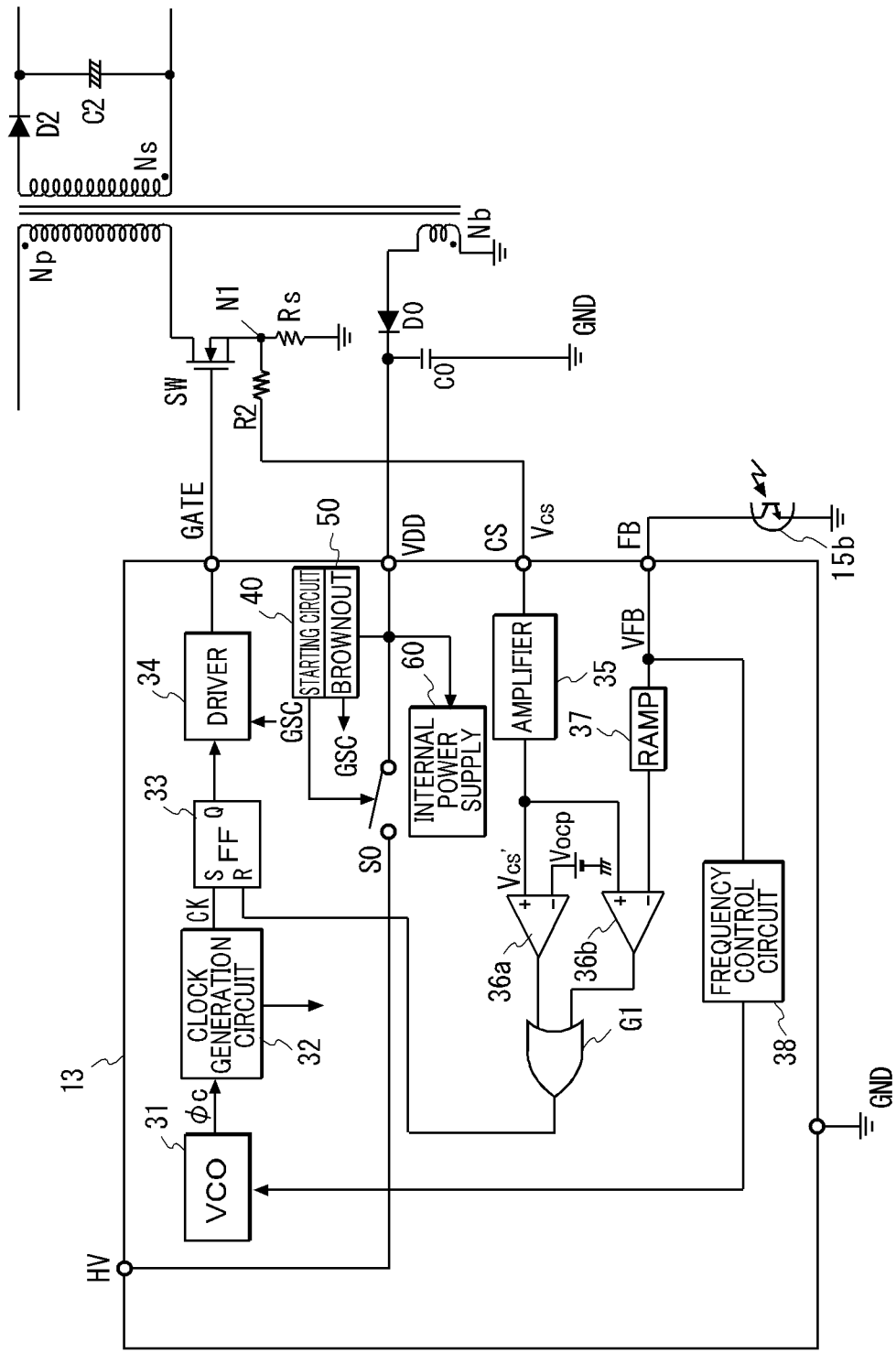
FIG. 2 is a circuit configuration view showing a configuration example of a primary-side switching power supply control circuit (power supply control IC) of a transformer in the AC-DC converter in FIG. 1.

As illustrated in FIG. 2, the power supply control IC 13 according to the example includes: an oscillation circuit 31 that oscillates at a frequency according to a voltage VFB of a feedback terminal FB; a clock generation circuit 32 including a circuit like a one-shot pulse generation circuit that generates a clock signal CK for providing the timing to turn on the primary-side switching transistor SW on the basis of an oscillation signal Φc generated in the oscillation circuit 31; an RS/flip-flop 33 that is set by the clock signal CK; and a driver (a driving circuit) 34 that generates a driving pulse GATE of the switching transistor SW in accordance with the output of the flip-flop 33.

Moreover, the power supply control IC 13 includes: an amplifier 35 that amplifies the voltage Vcs input to the current detection terminal CS; a comparator 36a as a voltage comparison circuit that compares an electric potential Vcs' amplified by the amplifier 35 with a comparison voltage (threshold voltage) Vocp for monitoring the overcurrent state; a waveform generation circuit 37 that generates a voltage RAMP with a predetermined waveform on the basis of the voltage VFB of the feedback terminal FB; a comparator 36b that compares the electric potential Vcs' that is amplified by the amplifier 35 with the waveform RAMP generated by the waveform generation circuit 37; and an OR gate G1 that takes the logical sum of the outputs of the comparators 36a and 36b.

By the output RS of the OR gate G1 being input to a reset terminal of the flip-flop 33, the timing to turn off the switching transistor SW is provided. A pull-up resistor or a constant current source is provided between the feedback terminal FB and an internal power supply voltage terminal, and the electric current flowing in the phototransistor 15b is converted into a voltage by the resistor.

Furthermore, the power supply control IC 13 in the example includes a frequency control circuit 38 that changes the oscillation frequency of the oscillation circuit 31, that is, the switching frequency on the basis of the voltage VFB of the feedback terminal FB in accordance with a predetermined characteristic. Although not shown, the oscillation circuit 31 includes a current source which allows the electric current to flow in accordance with the voltage from the frequency control circuit 38, and is formed of an oscillator whose oscillation frequency changes depending on the amount of the electric current supplied from the current source.

The power supply control IC 13 may include a duty limiting circuit that generates a maximum duty reset signal for limiting the duty (Ton/Tcycle) of the driving pulse GATE so that the duty does not exceed a prescribed maximum value (for example, 85% to 90%) on the basis of the clock signal CK output from the clock generation circuit 32.

Furthermore, the power supply control IC 13 in the example includes: a starting switch S0 which is provided between the high voltage input starting terminal HV and the power supply voltage terminal VDD; a starting circuit (start circuit) 40 which, when the voltage is input to the high voltage input starting terminal HV via the resistor R1, turns on the starting switch S0 to start the IC; a brownout detection circuit 50 which detects the brownout state to stop the switching control; and an internal power supply circuit 60 which generates the internal power supply voltage necessary for the operation of the internal circuit on the basis of the voltage of the power supply voltage terminal VDD.

Figure 3:
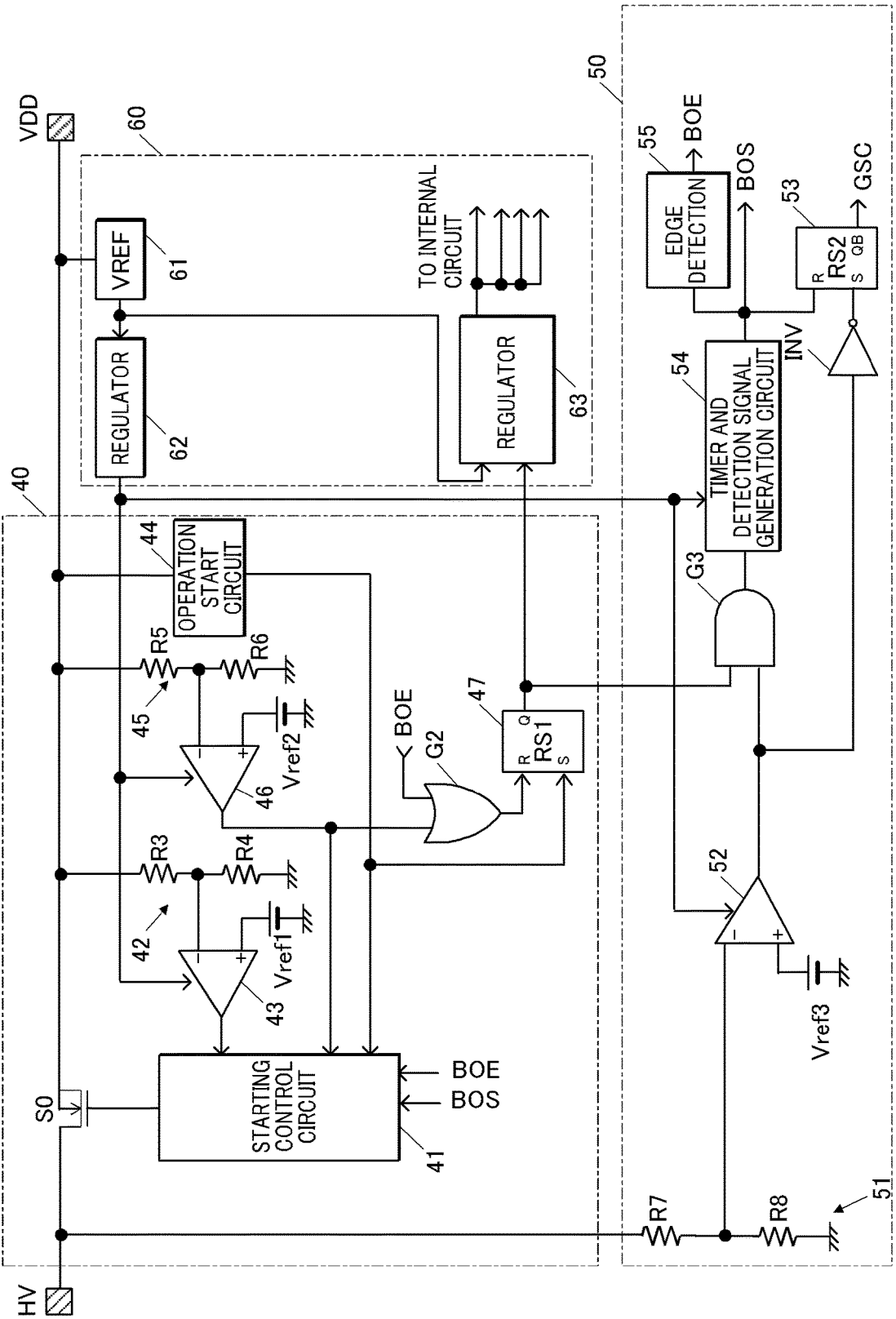
FIG. 3 is a circuit configuration view showing a configuration example of a starting circuit and a brownout detection circuit which form the power supply control IC in an example.

FIG. 3 shows a configuration example of the starting circuit 40 and the brownout detection circuit 50 and two regulators forming the internal power supply circuit 60 in the power supply control IC in FIG. 2.

As shown in FIG. 3, the internal power supply circuit 60 includes a reference voltage circuit 61 which generates a reference voltage VREF, a regulator 62 which generates a power supply voltage of the starting circuit 40 and the brownout detection circuit 50, and a regulator 63 which generates a power supply voltage of the internal circuit (circuit blocks 31 to 38 shown in FIG. 2). The regulator 62 is configured to continue the operation when the voltage of the power supply voltage terminal VDD is equal to or more than a predetermined voltage that is determined by the characteristic of the regulator. The regulator 63 is configured to be able to stop the operation by a control signal even if the voltage of the power supply voltage terminal VDD is the predetermined voltage or more.

As shown in FIG. 3, there are provided a starting control circuit 41 for controlling the starting switch S0 between the high voltage input starting terminal HV and the power supply voltage terminal VDD, a voltage division circuit 42 including resistors R3 and R4 that are connected in series between the power supply voltage terminal VDD and the ground point, and a comparator 43 to which the divided voltage and the reference voltage Vref1 are input and which has a hysteresis characteristic. The starting switch S0 is formed of a high withstand voltage depression type N-channel MOS transistor which is normally turned on.

The voltage of the high voltage input starting terminal HV and the power supply voltage terminal VDD is 0V before insertion of the plug into the outlet. When a voltage is applied to the high voltage input starting terminal HV by the insertion of the plug, an electric current flows from the high voltage input starting terminal HV to the power supply voltage terminal VDD through the starting switch S0 that is normally turned on, the capacitor C0 (FIG. 1) externally provided to the VDD terminal is charged, and the voltage of the VDD terminal gradually rises. Accordingly, the high voltage input starting terminal HV functions as an electric current inflow terminal.

The starting control circuit 41 turns off the starting switch S0 when the VDD terminal reaches a predetermined voltage such as 21V, for example. When the VDD terminal reaches the predetermined voltage such as 21V, the regulator 63 operates and the switching control of the switching transistor SW by the internal circuit is started. On the other hand, when the VDD terminal falls to the operation stop voltage (for example, VDD=6.5V) of the regulator 62, the starting switch S0 is turned on, and the voltage of the VDD terminal rises again to 21V.

When the protection function or the brownout detection function operates and the switching control of the transistor SW is stopped, the starting control circuit 41 controls the starting switch S0 in order to control the VDD terminal voltage within a certain range. In detail, on the basis of the output of the comparator 43, the starting control circuit 41 is configured to execute the control of turning on the starting switch S0 to allow an electric current to flow from the high voltage input starting terminal HV to the power supply voltage terminal VDD when the voltage of the VDD terminal falls to 12V, for example, and of turning off the starting switch S0 to block the electric current from the high voltage input starting terminal HV when the voltage of the VDD terminal rises to 13V, for example.

The starting circuit 40 further includes: an operation start circuit 44 which constantly monitors the voltage of the power supply voltage terminal VDD and, when the voltage reaches a voltage such as 19.6V, for example, starts the regulator 63 to generate the power supply voltage of the internal circuit and generates a signal to start the operation of the internal circuit; a voltage division circuit 45 formed of resistors R5, R6 connected in series between the ground point and the power supply voltage terminal VDD; and an operation stop circuit 46 formed of a comparator (voltage comparison circuit) which compares the divided voltage and a reference voltage Vref2, and, when the VDD falls to 6.5V, for example, stops the operation of the internal circuit by stopping the regulator 63 which generates the internal power supply voltage.

The output signal of the operation start circuit 44 is input to a set terminal of an RS flip flop (RS1) 47. The output signal of the above operation stop circuit 46 is input to a reset terminal of the RS flip-flop 47 via an OR gate G2, and the output signal of the flip-flop 47 is supplied as an operation control signal of the regulator 63 which generates the power supply voltage of the internal circuit.

The above starting control circuit 41 can be configured by including a resistor which is connected between the VDD terminal and the gate terminal of the starting switch S0, a Zener diode which is connected in the opposite direction between the ground point and the gate terminal of S0, a MOS transistor which is connected in parallel with the Zener diode, and a logic circuit which turns on and off the MOS transistor with the signals from the comparator 43, operation start circuit 44 and operation stop circuit 46, and the signals BOS and BOE from the brownout detection circuit 50 as inputs, for example.

The brownout detection circuit 50 includes a voltage division circuit 51 formed of high withstand voltage resistors R7 and R8 which are connected in series between the high voltage input starting terminal HV and the ground point, a comparator 52 which has a hysteresis characteristic for detecting that the voltage of HV falls to a threshold that is set to be a voltage which is approximately ⅔ of the peak value of AC input or less than 100V by comparing the voltage divided by the voltage division circuit 51 and a reference voltage Vref3, and an RS flip-flop (RS2) 53 which operates by the output signal of the inverter INV which inverts the output of the comparator 52. An inversion output QB of the flip-flop 53 is supplied to the driver 34 (FIG. 2) as an output stop signal GSC to stop the output of the driving pulse of the switching element SW. Thus, in a case where the alternating current power is input in a low AC input state, that is, the power supply control IC is started in the brownout state and the VDD terminal reaches the IC operation start voltage by the starting circuit 40 in that state, it is possible not to output the driving pulse GATE of the switching element SW.

The brownout detection circuit 50 includes: a timer and detection signal generation circuit 54 which measures a predetermined delay time (for example, 60 ms) from the detection of brownout and generates a detection signal; and an edge detection circuit 55 which detects the falling edge of the output signal of the timer and detection signal generation circuit 54. The output signal of the timer and detection signal generation circuit 54 is input to the reset terminal of the RS flip-flop 53.

Figure 4:
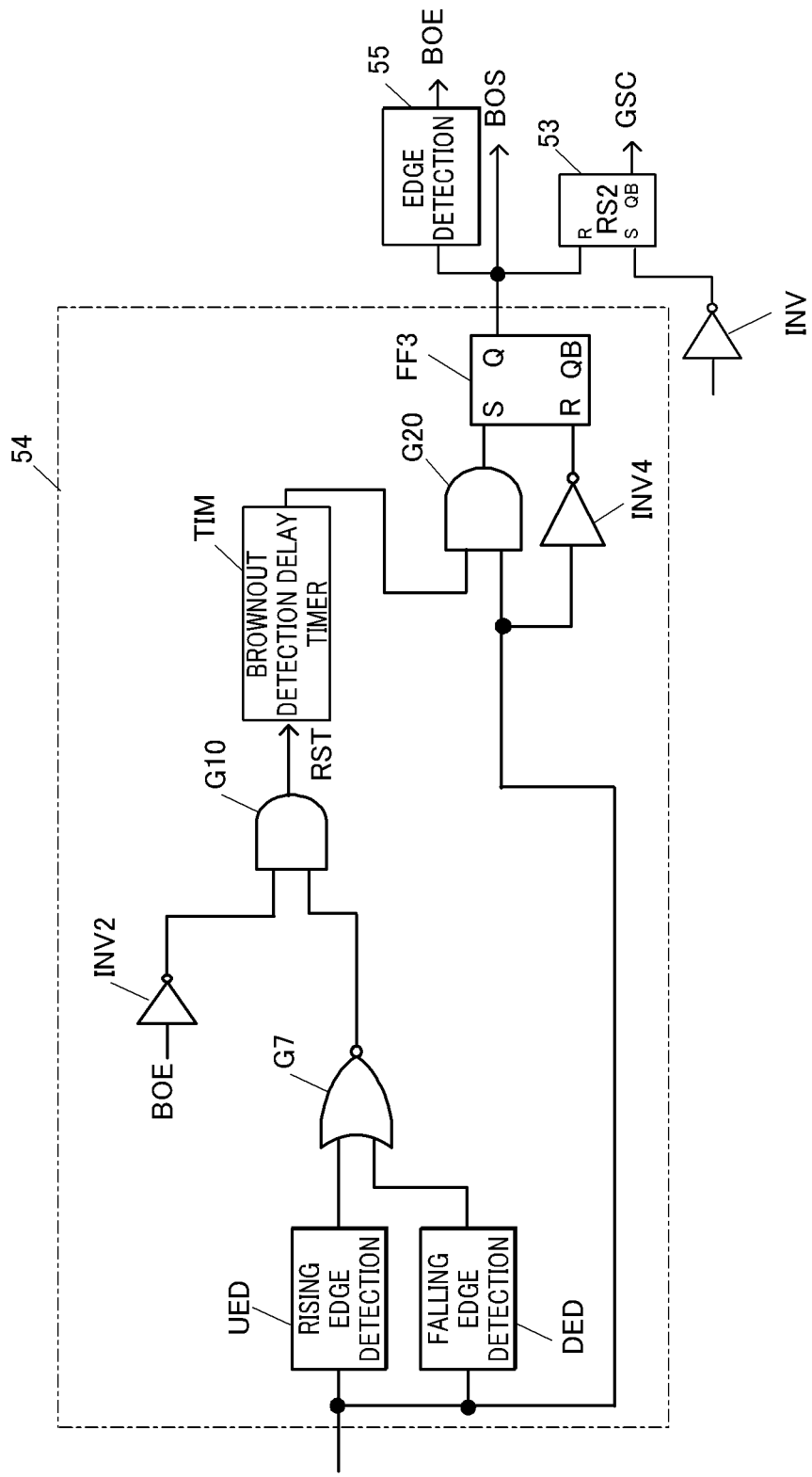
FIG. 4 is a circuit configuration view showing a specific example of a timer and a detection signal generation circuit which form the brownout detection circuit.

As shown in FIG. 4, the timer and detection signal generation circuit 54 includes a rising edge detection circuit UED and a falling edge detection circuit DED which detect the rising and falling edges of the output of the AND gate G3 (FIG. 3) to input the output signal of the comparator 52 and the output signal of the flip-flop 47 which is set by the output (operation start signal) of the operation start circuit 44, an OR gate G7 which takes the logical sum of the outputs of these circuits, an inverter INV2 which inverts the output BOE of the edge detection circuit 55; an AND gate G10 which takes the logical product of the outputs of the inverter INV2 and the OR gate G7; and a detection delay timer TIM which measures a delay time for detection of the brownout.

Furthermore, the timer and detection signal generation circuit 54 includes an AND gate G20 to which the output of the detection delay timer TIM and the output of the AND gate G3 are input; and an RS flip-flop FF3 which is set/reset by the signal obtained by the inverter INV4 inverting the output of the AND gate G3 and the output of the AND gate G20. The output of the flip-flop FF3 is output as the brownout detection signal BOS.

In the timer and detection signal generation circuit 54 having the above configuration, the time measuring operation of the detection delay timer TIM is started on the basis of the output signal of the AND gate G3. When a predetermined delay time (for example, 60 ms) elapses from the detection of brownout, the flip-flop FF3 is set by the output signal of the detection delay timer TIM, the output BOS changes to a high level and thereby the RS flip-flop 53 is reset. Accordingly, when the brownout state continues for a predetermined time, the output stop signal GSC of the driving pulse is output. The detection delay timer TIM is configured to perform the time measuring operation by the signal of the oscillator formed of a ring oscillator or the like with the regulator 62 as a power supply.

After the stop of outputting by the detection of brownout, when the voltage of the high voltage input starting terminal HV rises and the output signal of the comparator 52 is inverted, the RS flip-flop 53 is set by the inverter INV, the output stop signal GSC changes to a low level, and the output stop state is released. The output of the AND gate G3 changes to a low level by the inversion of the output signal of the comparator 52, the falling is detected by the falling edge detection circuit DED, and the output of the AND gate G10 changes to a low level. Thus, the output of the detection delay timer TIM changes to a low level, and a brownout end signal (pulse) is output from the edge detection circuit 55 which detects the falling edge.

The brownout end signal (pulse) is configured to reset the RS flip-flop 47 via the OR gate G2. At this time, the detection delay timer TIM is reset.

Figure 5:
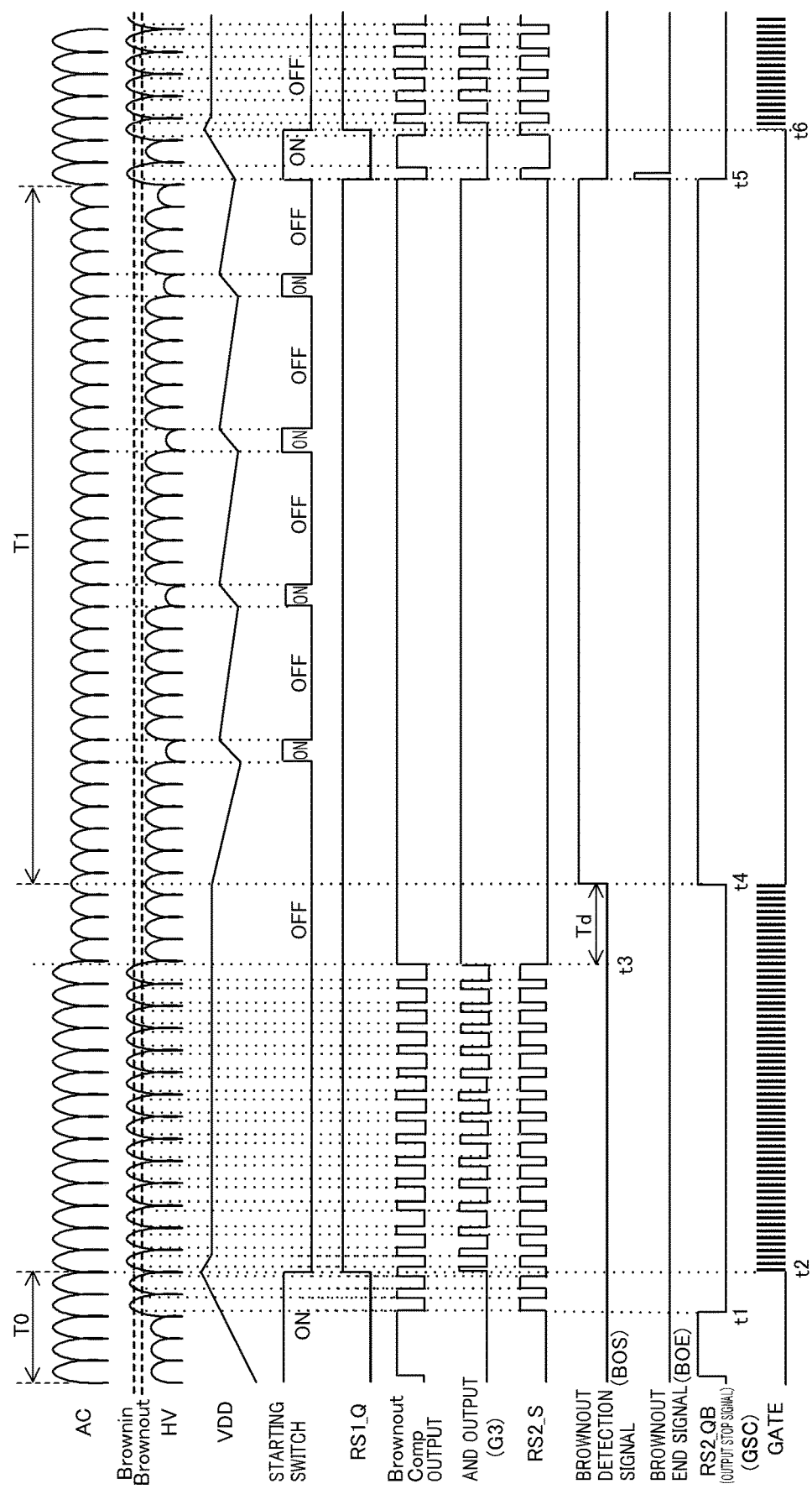
FIG. 5 is a timing chart showing the operation timing in a case where a normal switching control operation is performed by the starting from a relatively high state of the AC input (brown-in) in the power supply control IC in the example provided with the brownout function, the brownout state then occurs and continues for a while, and the state again shifts to the sufficiently high state of AC input (brown-in)

FIG. 5 shows voltage waveforms of the components in the power supply control IC 13 in a case where the power supply control IC 13 is started to start the switching control operation in a sufficiently high state of AC input (brown-in) immediately after the power is input, and thereafter the AC input falls to continue the brownout state for a while, and again shifts to a sufficiently high state of AC input. In FIG. 5, the AC shown uppermost, the next HV and the VDD respectively represent the alternating current input waveform, the waveform of the voltage VHV of the high voltage input starting terminal HV, and the voltage change of the power supply voltage terminal VDD. As shown in FIG. 5, the starting switch (S0) is in an on state immediately after the power is input.

In FIG. 5, since the AC input is sufficiently high from immediately after the power is input, at the timing t1 when the voltage VHV of the high voltage input starting terminal HV exceeds a detection level of the brownout detection circuit 50, the output of the comparator (Brownout Comp) 52 changes to a low level, and repeatedly changing of the high/low according to the change in AC input is started. The voltage of the power supply voltage terminal VDD gradually increases immediately after the power is input. When the voltage exceeds 19.6V, the flip-flop 47 is set by the output of the operation start circuit 44 to change its output RS1_Q to a high level, and the regulator 63 starts the operation (timing t2), and the power supply voltage is supplied to the internal circuit to start the operation. Thus, the driving pulse GATE of the switching element SW is output. The starting switch S0 is turned off.

Thereafter, when the AC input falls to be lower than the detection level of the brownout at the timing t3, the output signal (Brownout) of the flip-flop FF3 of the timer and detection signal generation circuit 54 changes to a high level to reset the flip-flop 53 at the timing t4 which is delayed by the measured time Td of the detection delay timer TIM. The output stop signal GSC changes to a high level to stop the output of the driving pulse of the switching element SW, and the operation of the regulator 63 of the internal circuit stops. In the brownout state, the starting circuit 40 performs latch control of repeatedly turning on/off the starting switch S0 (period T1).

Thereafter, when the AC input rises to be higher than the detection level of the brown-in, the output of the comparator (Brownout Comp) 52 changes to a low level (timing t5). The flip-flop 53 is set to change the output stop signal GSC which is the inverted output of the flip-flop 53 changes to a low level, and the output stop state by the brownout state is released. Thereafter, when the voltage of the VDD terminal reaches the operation start voltage, the driving pulse GATE of the switching element SW is output (timing t6).

As described above, the comparator 52 included in the brownout detection circuit 50 of the example can be operated even immediately after the starting by the input of alternating current power. Immediately after the starting, the starting switch S0 is turned on, and the electric current flows toward the internal circuit of the IC and the capacitor connected to the VDD terminal from the alternating current power supply. Thus, the voltage input to the HV terminal possibly becomes the brownout state even if the alternating current power supply is in the brown-in state depending on the resistance value and the input voltage level due to the influence by the external resistor connected to the high voltage input terminal HV. In the example, in order to prevent the wrong detection, the AND gate G3 taking the logical product of the operation start signal and the output signal of the comparator 52 is provided, and the detection delay timer TIM measuring the delay time (duration) Td is made effective by the output of the AND gate G3.

Figure 6:
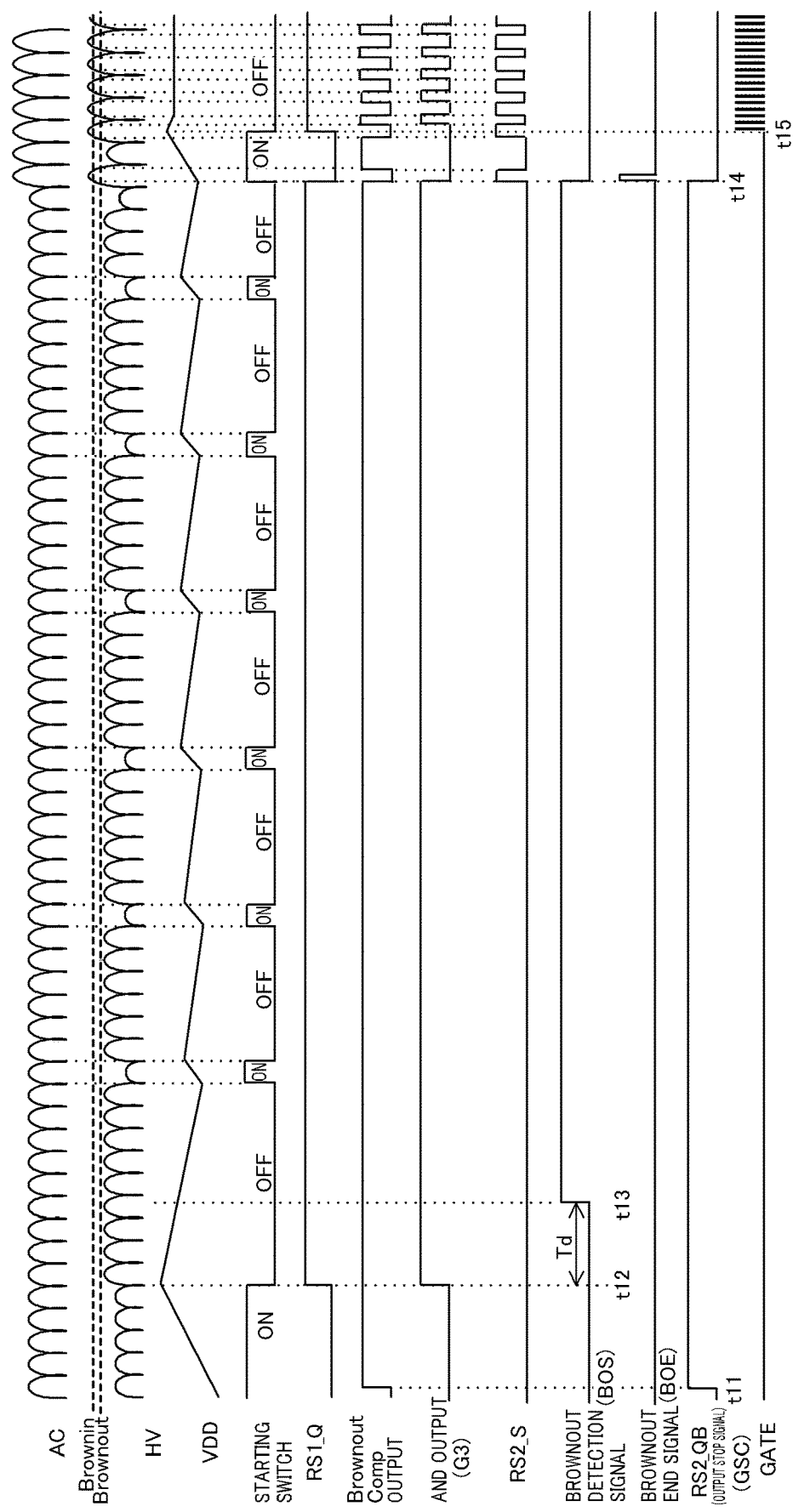
FIG. 6 is a timing chart showing the operation timing in a case where the starting is performed from a relatively low state of AC input (brownout) in the power supply control IC in the example provided with the brownout function, the brownout state is detected and continues for a while, and thereafter the state shifts to a sufficiently high state of AC input (brown-in)

FIG. 6 shows the voltage waveforms of the components in the power supply control IC 13 in a case where the AC input shifts to a state of a sufficiently high state of the AC input after the state of low AC input (brownout state) continues for a while immediately after the power is input.

In FIG. 6, when the starting switch S0 is in an on state from immediately after the input of power and the voltage of the power supply voltage terminal VDD gradually increases to operate the regulator 62, the brownout detection circuit 50 operates. Since the AC input is low, the output of the comparator (Brownout Comp) 52 becomes a high level, and the output stop signal GSC changes to a high level to stop the output of the driving pulse GATE (timing t11).

When the voltage of the power supply voltage terminal VDD becomes higher to exceed 19.6V by the turning on of the starting switch S0, the flip-flop 47 is set by the output of the operation start circuit 44 to change its output RS1_Q to a high level, and the output of the AND gate G3 changes to a high level (timing t12). Then, the detection delay timer TIM of the timer and detection signal generation circuit 54 starts the time measuring operation, and the output signal (Brownout) changes to a high level after the predetermined delay time Td (timing t13). Since the output stop signal GSC is already at a high level at this time, the output stop state of the driving pulse GATE continues.

Thereafter, when the AC input rises to be higher than the detection level of the brown-in, the output of the comparator (Brownout Comp) 52 changes to a low level (timing t14). The flip-flop 53 is set and the output stop signal GSC which is the inverted output of the flip-flop 53 changes to a low level. When the starting switch S0 is turned on and the power supply voltage terminal VDD reaches the operation start voltage, the driving pulse GATE of the switching element SW is output (timing t15).

FIG. 7 shows a specific circuit example of the operation start circuit 44 forming the starting control circuit 41 in FIG. 3. Different from the comparator which needs a reference voltage to be compared with the voltage of the monitoring target, the operation start circuit 44 in the example is a circuit configured to be able to detect that the monitoring target becomes a predetermined voltage or more without using a reference voltage.

The operation start circuit 44 shown in FIG. 7 includes: a resistor R11 and a reverse-direction Zener diode Dz which are connected in series between the power supply voltage terminal VDD and the ground point; MOS transistors M1, M2 and a resistor R12 in series which are connected in parallel with the resistor R11 and the reverse-direction Zener diode Dz; a MOS transistor M3 which is connected in series with the MOS transistor M1; and a constant current source CC and a MOS transistor M4 which are connected in series between the power supply voltage terminal VDD and the ground point.

Among the MOS transistors M1 to M4, the MOS transistors M1 to M3 are P-channel MOS transistors, and the MOS transistor M4 is an N-channel MOS transistor. A Zener diode for which the reverse-direction voltage Vz is set to be 18V, for example, is used as the Zener diode Dz. MOS transistors for which the threshold voltage Vth is set to be 0.8V, for example, are used as the MOS transistors M1 to M4.

The MOS transistor M1 is a diode-connected transistor in which the gate terminal and the drain terminal are connected, and the gate terminal of the MOS transistor M2 is connected to the connection node N1 between the resistor R11 and the Zener diode Dz. The gate terminal of the MOS transistor M3 is connected to the connection node N3 between the constant current source CC and the MOS transistor M4. The gate terminal of the MOS transistor M4 is connected to the connection node N2 between the MOS transistor M2 and the resistor R12.

In the operation start circuit 44 in the example, a drain current flows in the MOS transistor M1 when the voltage between the source and drain of the MOS transistor M1 is a threshold voltage Vth (=0.8V) or more, and a drain current flows in the MOS transistor M2 when the source potential is higher than the potential of the node N1 by the Vth (=0.8V) or more. Thus, when the power supply voltage terminal VDD rises to 19.6V (=Vz+2Vth), an electric current starts to flow in the MOS transistors M1, M2 and the resistor R12, and the electric potential of the connection node N2 rises to a predetermined electric potential from the ground potential.

When the connection node N2 rises to a threshold voltage of the MOS transistor M4, the MOS transistor M4 is turned on and the connection node N3 falls to the ground potential. Thus, the MOS transistor M3 is turned on. When the MOS transistor M3 is turned on, the source potential of the MOS transistor M2 immediately becomes the VDD voltage. Thus, the MOS transistor M2 comes into an on state completely, and the connection node N2 also follows the VDD voltage.

In a case where the constant current source CC and the MOS transistors M3, M4 are not provided, the voltage exceeds the threshold voltage of the MOS transistor M2, and the drain current starts to flow and gradually comes into an on state. Since there is no means to make the source voltage of the MOS transistor M2 be the VDD voltage immediately, the MOS transistor M2 does not come into the on state completely. As a result, when the electric potential of the terminal VDD rises as shown in FIG. 8A, the electric potential of the connection node N2 slowly rises as shown in FIG. 8B.

On the other hand, in a case where the constant current source CC and the MOS transistor M4 are connected as in the operation start circuit in the example, the electric potential of the connection node N2 rises rapidly as shown in FIG. 8C.

If the electric potential of connection node N2 rises slowly as shown in FIG. 8B, a through-current flows in a logic circuit at a subsequent stage connected to the connection node N2, affecting the characteristics of the IC.

By using the operation start circuit as described above, compared with a case of using a comparator using a reference voltage circuit which requires a time for rising, the number of elements can be smaller than a case of the comparator, and the operation can be made without a reference voltage of a regulator, a band gap or the like.

Figure 9:
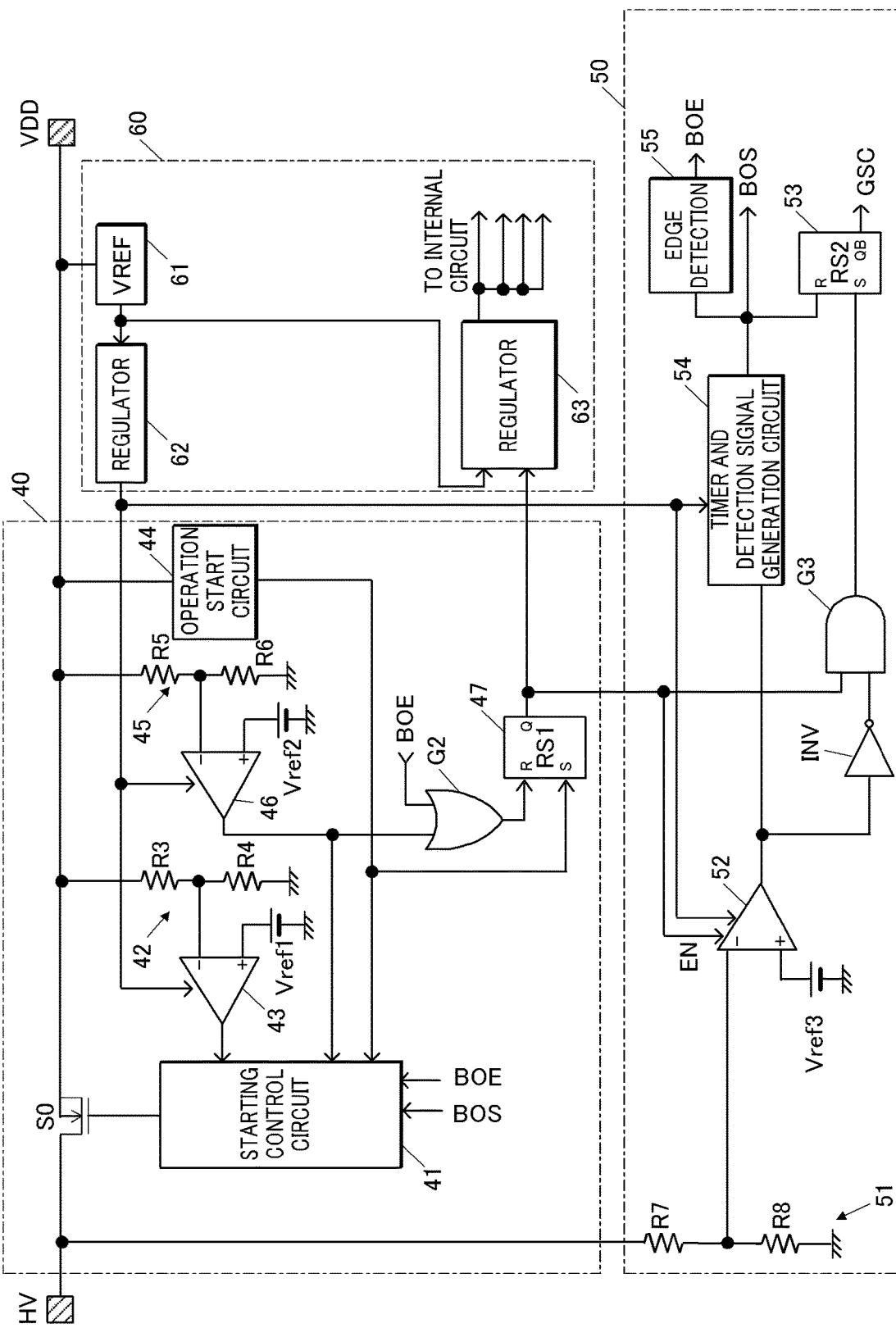
FIG. 9 is a circuit configuration view showing a modification example of the brownout detection circuit in the example of FIG. 3.

FIG. 9 shows a modification example of the brownout detection circuit 50 shown in FIG. 3. In the modification example, the AND gate G3 intervenes between the inverter INV and the flip-flop 53. A circuit with an enable terminal is used as the comparator 52 for detecting the brownout, and the output of the flip-flop 47 outputting the signal to control the regulator 63 is supplied as an enable signal EN to the comparator 52. Even by the brownout detection circuit in such a configuration, the operation similar to that of the brownout detection circuit shown in FIG. 3 can be performed.

Figure 10:
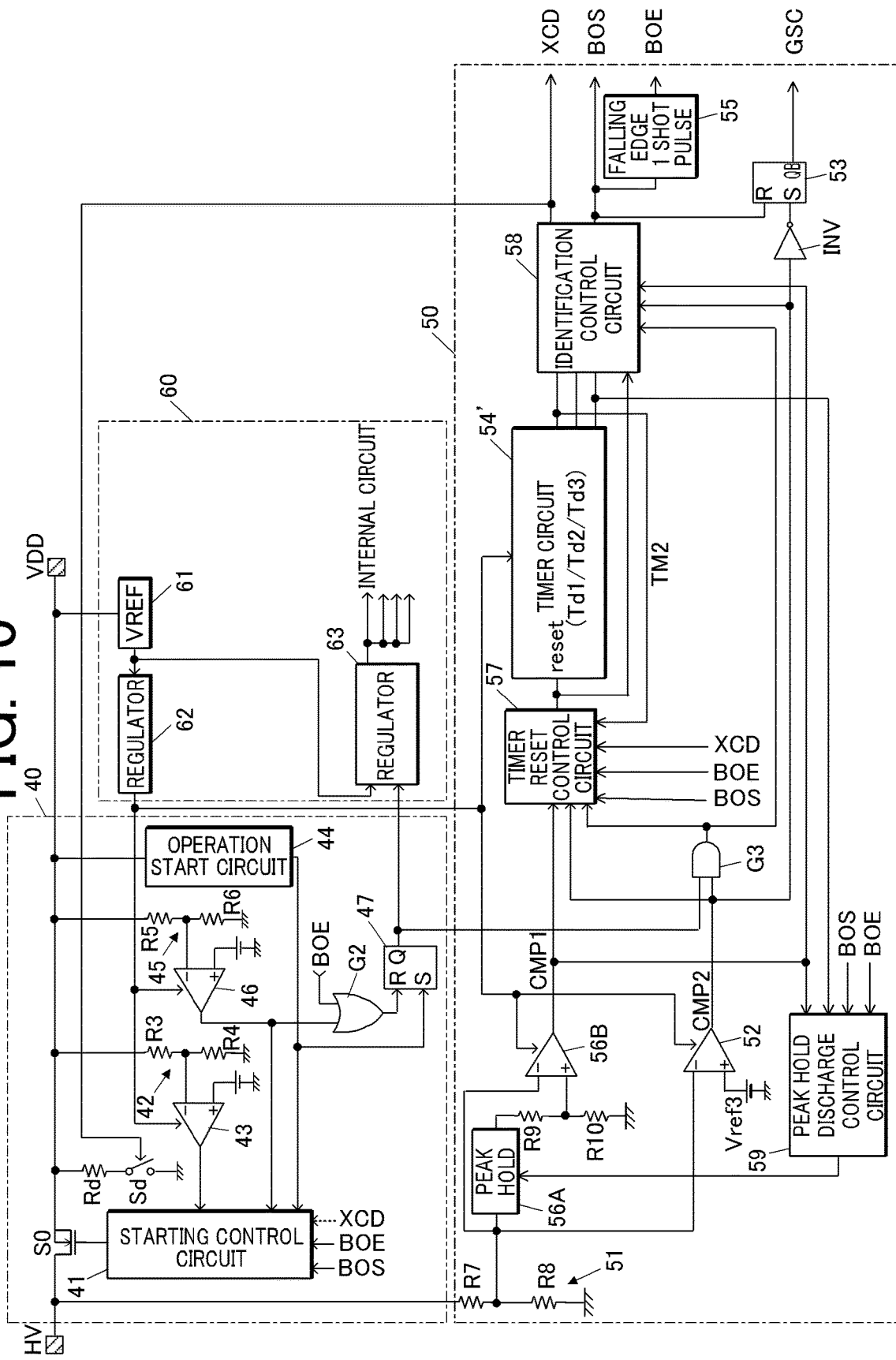
FIG. 10 is a circuit configuration view showing a second example of the brownout detection circuit.

FIG. 10 shows a second example of the power supply control IC according to the present invention. In the example, there is provided a discharger which is formed of a resistor Rd and a switch Sd connected in series with the starting switch S0 between the high voltage input starting terminal HV and the ground point. The brownout detection circuit 50 includes a plug removal detection function in addition to the brownout detection function. Though the discharger (Rd, Sd) is shown in the starting circuit 40 in the drawing, the discharger may be configured as a functional circuit separate from the starting circuit 40. The switch Sd for discharging can be configured by an enhancement-type MOS transistor with a middle withstand voltage, for example.

As shown in FIG. 10, there are provided: a peak hold circuit 56A which holds a peak value of the voltage divided by the voltage division circuit 51 which divides the voltage of the high voltage input starting terminal HV; and a comparator 56B which compares the voltage divided by resistors R9 and R10 connected between the ground point and the output terminal of the peak hold circuit 56A and the voltage divided by the voltage division circuit 51. There are also provided: a timer reset control circuit 57 to which the output of the comparator 56B and the output signal of the comparator 52 and the AND gate G3 are input; an identification control circuit 58 which is provided at the subsequent stage of the timer circuit 54'; and a discharge control circuit 59 which generates a discharge signal for discharging a capacitor which is one of the elements forming the peak hold circuit 56A on the basis of the output of the comparator 56B, the output of the timer circuit 54', and the output of the identification control circuit 58.

There is an advantage that, in a case where the AC input rapidly changes, the peak hold circuit 56A cannot promptly follow the peak voltage after the voltage changed to be lower than the voltage before change, but can discharge the peak hold capacitor by generating the discharge signal.

In the example, the timer circuit 54' can measure a predetermined delay time from the detection of brownout and the detection of plug removal and a delay time of the signal for discharging the peak hold circuit 56A. The identification control circuit 58 is configured to determine the plug removal by measuring, with the timer circuit 54', the time during which the voltage Vn0 divided by the voltage division circuit 51 is not lower than the voltage VTH which is obtained by proportional reduction of the voltage Vp held by the peak hold circuit 56A. In detail, when the state in which the Vn0 is not lower than the VTH continues for 30 ms, for example, the identification control circuit 58 determines that the plug removal occurs, and outputs a discharge signal of the X capacitor. The VTH which is a threshold level for determining the plug removal is set to be higher than the brownout detection level at the time of normal operation with sufficiently high AC input.

The time measuring operation of the timer circuit 54' is started by the output signal of the AND gate G3 to which the output signal of the comparator 52 and the output signal of the flip-flop 47 forming the starting circuit 40 are input. When a predetermined delay time (for example, 60 ms) elapses from the detection of brownout, the identification control circuit 58 determines that the current state is the brownout state on the basis of the output signal of the timer circuit 54', and outputs the brownout detection signal BOS.

The RS flip-flop 53 is reset by this signal, and the output stop signal GSC of the driving pulse is output.

Furthermore, after the stop of outputting by the detection of brownout, when the voltage of the high voltage input starting terminal HV rises to invert the output signal of the comparator 52, the RS flip-flop 53 is set by the inverter INV, the output stop signal GSC changes to a low level and the output stop state is released. By the inversion of the output signal of the comparator 52, the output of the AND gate G3 changes to a low level, and the brownout detection signal BOS output from the identification control circuit 58 changes to a low level. The edge detection circuit 55 which detects the falling edge outputs the brownout end signal (pulse) BOE.

Figure 11:
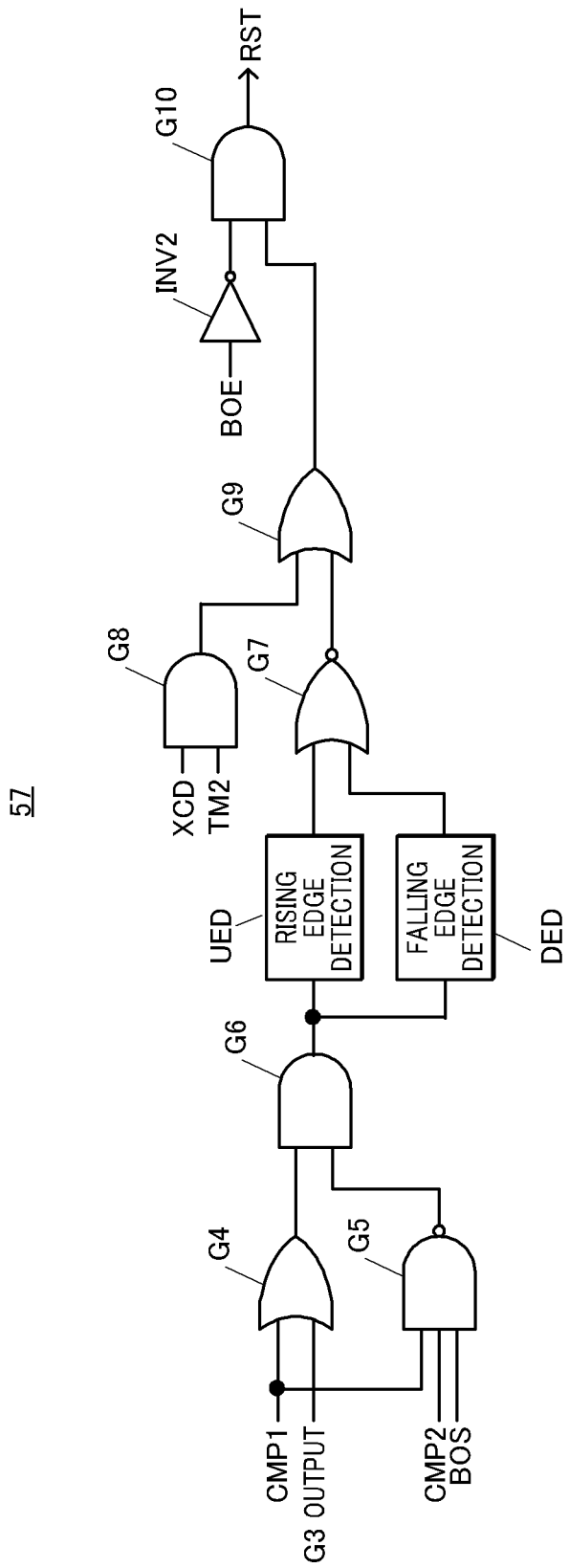
FIG. 11 is a circuit configuration view showing a configuration example of a timer reset control circuit forming the brownout detection circuit of the second example.
Figure 12:
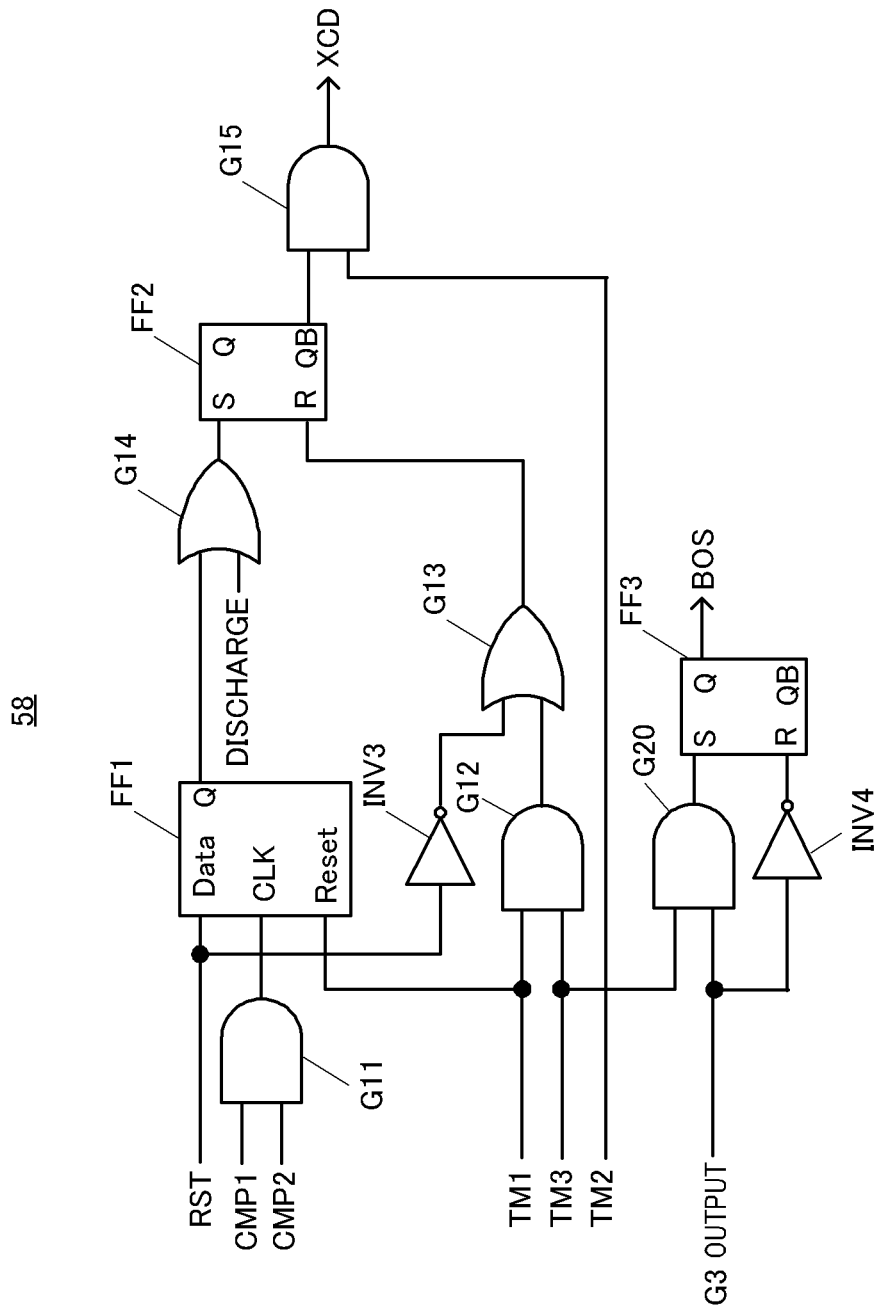
FIG. 12 is a circuit configuration view showing a configuration example of an identification control circuit forming the brownout detection circuit in the second example.
Figure 13:
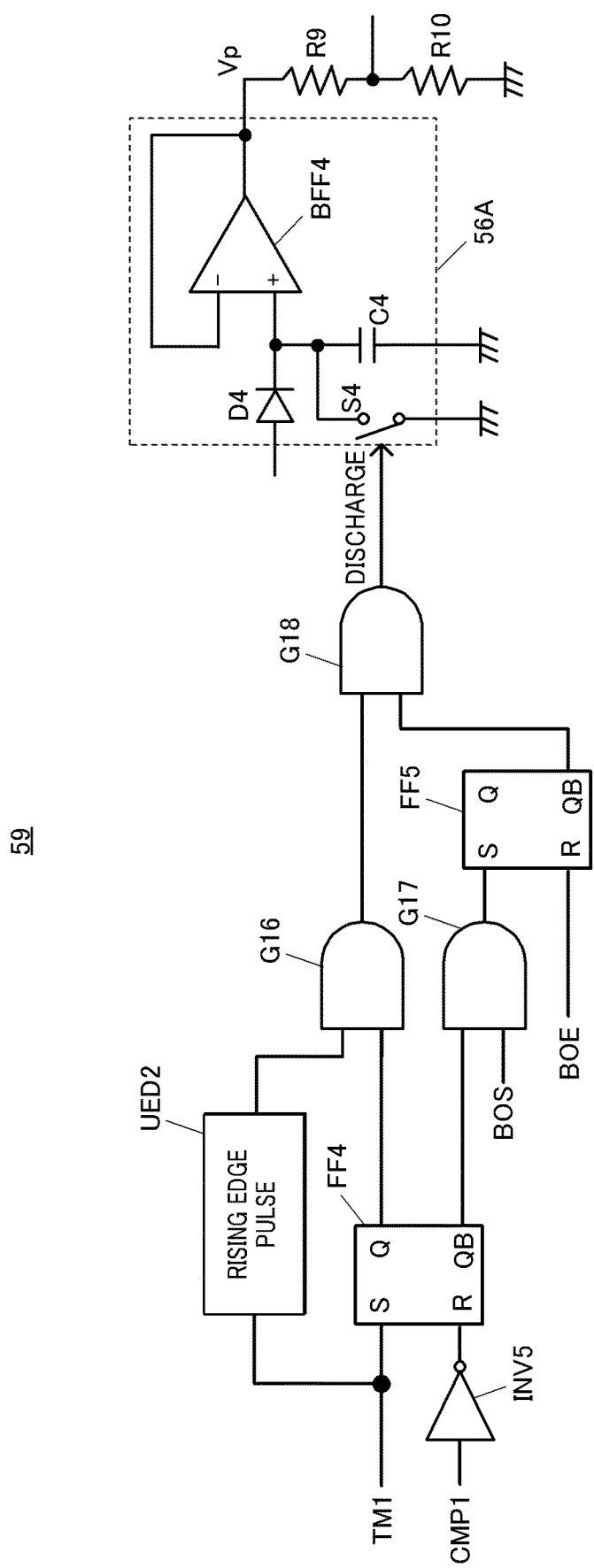
FIG. 13 is a circuit configuration view showing a configuration example of a peak hold circuit and a discharge control circuit forming the brownout detection circuit in the second example.

FIG. 11 shows a specific circuit example of the timer rest control circuit 57 forming the brownout and plug removal detection circuit 50 in FIG. 10. FIG. 12 shows a specific circuit example of the identification control circuit 58. FIG. 13 shows a specific circuit example of a peak hold circuit 56A and a discharge control circuit 59.

Among them, as shown in FIG. 11, the timer reset control circuit 57 includes: an OR gate G4 to which the output CMP1 of the comparator 56B for detecting plug removal and the output of the AND gate G3 are input; a NAND gate G5 to which the output CMP1 of the comparator 56B and the output CMP2 of the comparator 52 for detecting the brownout and the brownout detection signal BOS output from the identification control circuit 58 are input; an AND gate G6 to which the output of the NAND gate G5 and the output of the OR gate G4 are input; a rising edge detection circuit UED which detects the rising edge of the output of the AND gate G6; and a falling edge detection circuit DED which detects the falling edge of the output of the AND gate G6.

The timer reset control circuit 57 further includes: a NOR gate G7 to which the output of the rising edge detection circuit UED and the output of the falling edge detection circuit DED are input; an AND gate G8 to which an X capacitor discharge signal XCD output from the identification control circuit 58 and a timeout signal TM2 of a plug removal detection delay time Td2 output from the timer circuit 54' are input; and an OR gate G9 to which the output of the AND gate G8 and the output of the NOR gate G7 are input; and an AND gate G10 to which a signal obtained by inverting the brownout end signal BOE output from the identification control circuit 58 with the inverter INV2 is input. The output of the AND gate G10 is supplied as the reset signal RST to the timer circuit 54'.

As shown in FIG. 12, the identification control circuit 58 includes: an AND gate G11 to which the output CMP1 of the comparator 56B for detecting plug removal and the output CMP2 of the comparator 52 for detecting the brownout are input; a D-type flip-flop FF1 which takes in a rest signal RST that is the output of the timer reset control circuit 57 with the output of the AND gate G11 as a clock signal; an AND gate G12 to which the timeout signal TM1 of the discharge delay time Td1 of the peak hold circuit and the timeout signal TM3 of the brownout detection delay time Td3 are input; and an OR gate G13 to which the output of the AND gate G12 and the signal obtained by inverting the reset signal RST with the inverter INV3 are input.

The identification control circuit 58 includes: an OR gate G14 to which the output of the D-type flip-flop FF1 and the output signal "DISCHARGE" of the discharge control circuit 59 are input; an RS flip-flop FF2 which is set and reset by the output of the OR gate G14 and the output of the OR gate G13; and an AND gate G15 to which the inverted output of the flip-flop FF2 and the timeout signal TM2 of the delay time Td2 of the plug removal detection are input. The output of the ANG gate G15 is output as the discharge signal XCD of the X capacitor.

The identification control circuit 58 further includes: an AND gate G20 to which the timeout signal TM3 of the brownout detection delay time Td3 and the output of the AND gate G3 (FIG. 10) are input; and an RS flip-flop FF3 which is set and reset by the output of the AND gate G20 and the signal obtained by inverting the output of the AND gate G3 with the inverter INV4. The output of the flip-flop FF3 is output as the brownout detection signal BOS.

As shown in FIG. 13, the discharge control circuit 59 includes: an RS flip-flop FF4 which is set and reset by a timeout signal TM1 of the discharge delay time Td1 of the peak hold circuit and a signal obtained by inverting the output CMP1 of the comparator 56B for detecting plug removal with the inverter INV 5; a rising edge detection circuit UED2 which detects a rising edge of the timeout signal TM1 of the discharge delay time Td1 of the peak hold circuit; and an AND gate G16 to which the output of the rising edge detection circuit UED2 and the RS flip-flop FF4 are input.

The discharge control circuit 59 includes: an AND gate G17 to which the inverted output of the RS flip-flop FF4 and the brownout detection signal BOS are input; an RS flip-flop FF5 which is set and reset by the output of the AND gate G17 and the brownout end signal BOE; and an AND gate G18 to which the inverted output of the RS flip-flop FF5 and the output of the AND gate G16 are input. The output of the AND gate G18 is output to the peak hold circuit 56A as an output signal "DISCHARGE" of the discharge control circuit 59.

As shown in FIG. 13, the peak hold circuit 56A includes a diode D4 whose anode terminal is connected to a node of the voltage division circuit 51; a capacitor element C4 which is connected between the cathode terminal of the diode D4 and the ground point; a buffer BFF4 formed of a voltage follower whose input terminal is connected to the connection node between the diode D4 and the capacitor element C4; and a discharge switch S4 which is connected in parallel with the capacitor element C4. The electric charges of the capacitor element C4 are discharged by the discharge switch S4 being turned on by the output signal "DISCHARGE" of the discharge control circuit 59. The discharge signal from the discharge control circuit 59 is set to change to a high level and turn on the discharge switch S4 when a predetermined time (for example, 15 ms) elapses from the reset of the timer circuit 54'.

As described above, the brownout detection delay time, the plug removal detection delay time, and the discharge delay time are measured by the common timer circuit 54'. Thus, it is possible to reduce the possession area of the circuit and reduce the chip size of IC compared with a case where timer circuits are separately provided. The brownout detection delay time, the plug removal detection delay time, and the discharge delay time are set in a multiple-relationship. For example, the brownout detection delay time, the plug removal detection delay time, and the discharge delay time are set to be 60 ms, 30 ms and 15 ms, respectively. Thus, in a case where the timer circuit 54' is formed of a frequency division circuit having a plurality of flip-flops in a cascade connection, the time measuring signal of 30 ms may be taken from the step number which is half the time measuring signal of 60 ms, and the time measuring signal of 15 ms may be taken from the step number which is a quarter of the time measuring signal of 60 ms. Thus, there is an advantage that the signal can be generated easily.

The timer reset control circuit 57 and the identification control circuit 58 are provided because the states of the output CMP1 of the comparator 56B (Plugout Comp) for detecting plug removal and the output CMP2 of the comparator 52 (Brownout Comp) for detecting the brownout are classified into four cases as shown in FIGS. 14A to 14D according to the AC input level, and it becomes difficult to perform setting of the timing to reset the timer when the above three types of delay times are measured by a common timer circuit if each of the states is not grasped. In detail, for example, if the timer circuit 54' is reset in order to start the time measuring of the discharge delay time during detection of the brownout, the time measuring of the brownout detection delay time is interrupted. Thus, such an operation needs to be avoided.

In the brownout and plug removal detection circuit 50 shown in FIG. 10, it is possible to accurately detect the brownout state and the plug removal state by grasping the above four states and resetting the timer circuit 54' according to each of the states.

Figure 15:
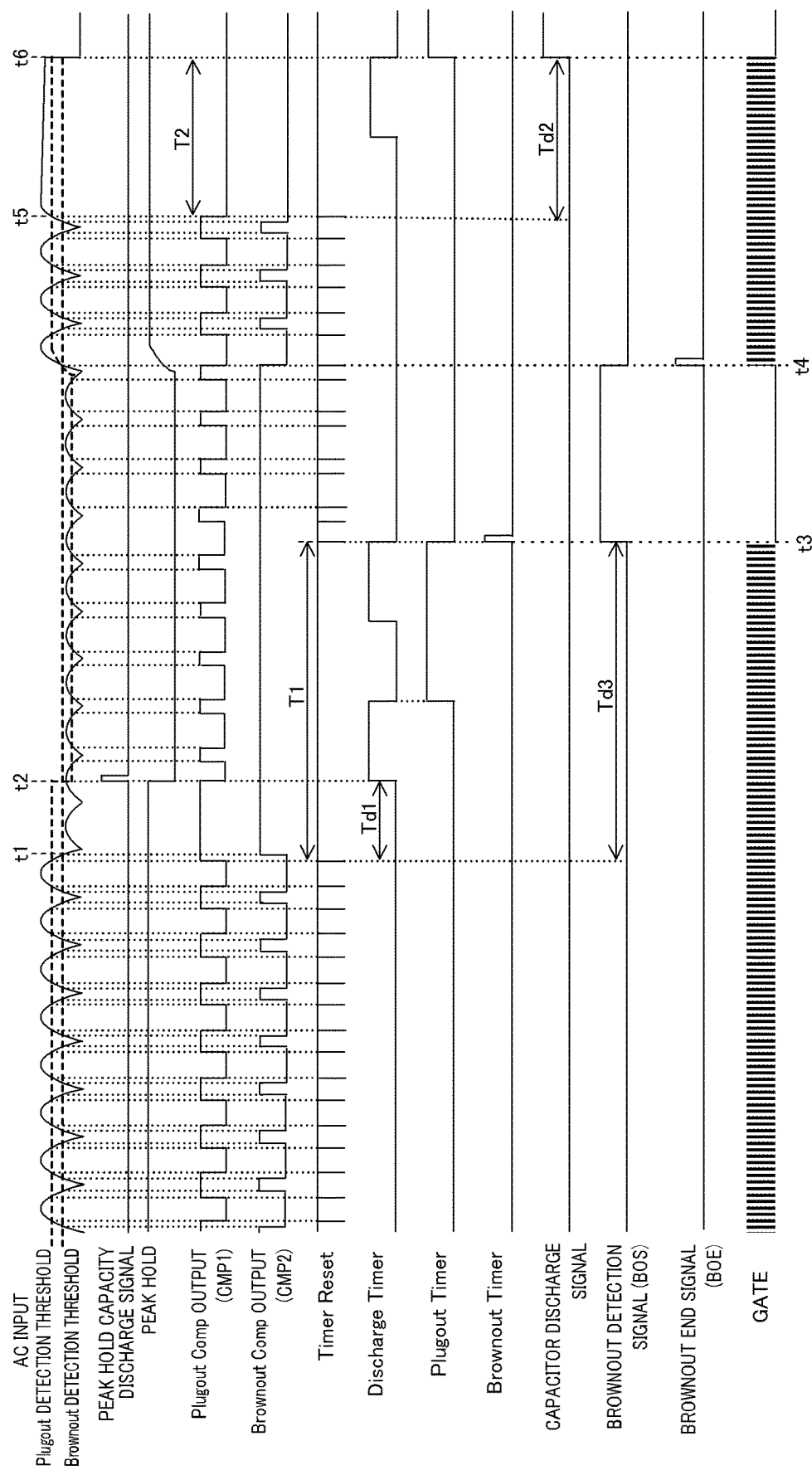
FIG. 15 is a timing chart showing the operation timing of a power supply control IC in the second example after the brownout state occurs and continues for a while during the normal switching control operation and shifts again to the sufficiently high state of AC input.

FIG. 15 shows voltage waveforms of the components in the power supply control IC 13 in a case where the AC input falls during the switching control operation by the power supply control IC 13 in a sufficiently high state of AC input, the brownout state continues for a while, thereafter the AC input again shifts to a sufficiently high state and the plug removal (Plugout) occurs. In FIG. 15, t1 is the timing when the AC input falls to go into the brownout state, t2 is the discharge timing of the peak hold capacitor, t3 is the timing when the AC input rises and comes out of the brownout state, and t4 is the timing when the plug removal occurred.

As seen from FIG. 15, the reset pulse of the timer circuit 54' is generated in synchronization with the output of the AND gate G6 (FIG. 11) of the timer reset control circuit 57, and as a result, the reset pulse is synchronized with the output of the comparator 56B. In order to measure various timer times more accurately, the reset pulse is generated for each of the rising edge and the falling edge of the output of the comparator 56B. The timer circuit 54' is configured to start the time measuring operation from 0 each time the reset pulse is input.

As seen from FIG. 15, the reset pulse of the timer circuit 54' is not generated in a period T1 from the timing t1 when the AC input falls to go into the brownout state to the timing t3 when the brownout detection signal changes to a high level, or in a period T2 from the timing t5 when the plug removal occurs to the timing t6 when the X capacitor discharge signal changes to a high level. Thus, the timer circuit 54' measures the delay time Td3 for detecting brownout from the timing t1, measures the delay time Td2 for detecting plug removal from the timing t5, and can change the respective corresponding signals. The discharge signal (pulse) "DISCHARGE" of the peak hold capacitor is output at the timing t2 when the delay time Td1 of the discharge of the peak hold circuit 56A elapses from the timing t1 when the AC input goes into the brownout state.

Though the present invention has been described in detail on the basis of the embodiment, the present invention is not limited to the embodiment or the examples. For example, in the embodiment (FIG. 10), the discharge switch Sd is directly controlled by the discharge signal XCD of the X capacitor output from the identification control circuit 58 at the subsequent stage of the timer circuit 54. However, the discharge switch Sd may be controlled by a control signal generated with a logic of the starting control circuit 41 by inputting the discharge signal XCD of the X capacitor to the starting control circuit 41 as shown by the dotted line in FIG.

10. In the embodiment, the switching transistor SW which allows an electric current to flow intermittently in the primary-side winding wire of the transformer is an element separate from the power supply control IC 13. However, the switching transistor SW may be incorporated into the power supply control IC 13 as a single semiconductor integrated circuit.

Though the embodiment has been described for a case where the present invention is applied to the power supply control IC included in a flyback type AC-DC converter, the present invention can be applied to the power supply control IC included in an AC-DC converter of a forward type and a quasi-resonant type, and further the power supply control IC included in an AC-DC converter of a PSR (Primary Side Regulation) type which controls the output voltage on the secondary side by only the information obtained on the primary side.

According to an aspect of the present invention, there is provided a semiconductor device for switching power supply control including: a power supply terminal to which a voltage obtained by smoothing an induced voltage with an external capacitor is input, the induced voltage being a voltage induced in an auxiliary winding wire of a transformer which includes the auxiliary winding wire and in which a voltage obtained by rectifying an alternating current voltage is applied to a primary-side winding wire; a current inflow terminal to which the voltage obtained by rectifying the alternating current voltage is input via a resistor; a starting circuit which allows an electric current to flow to the power supply terminal via a switch and charges the capacitor, the switch being connected between the current inflow terminal and the power supply terminal; and a brownout detection circuit which is connected to the current inflow terminal and detects brownout, wherein a control signal of a switching element that is connected in series with the primary-side winding wire of the transformer is generated, the starting circuit includes: a first comparator to which a voltage of the power supply terminal is input and which has a first threshold and a second threshold that is lower than the first threshold; a starting control circuit which controls on and off of the switch based on an output of the first comparator; and an operation start circuit which detects that the voltage of the power supply terminal becomes equal to or more than a predetermined voltage that is higher than the first threshold without using a voltage to be compared, and which generates a signal for operating an internal circuit, and the brownout detection circuit includes: a voltage divider which divides a voltage of the current inflow terminal; a second comparator which has a hysteresis characteristic for detecting generation of a brownout state by comparing the voltage divided by the voltage divider and a predetermined voltage; a timer circuit to which an output of the second comparator and an output of the operation start circuit are input, and which measures a predetermined time during which the generation of the brownout state continues; and an output stop circuit which stops outputting of a switching control signal based on an output of the timer circuit.

The semiconductor device for switching power supply control having the configuration as described above includes an operation start circuit which detects that the voltage of the power supply terminal is equal to or more than a predetermined voltage higher than a second threshold of a first comparator that provides an input of the starting control circuit for controlling on and off of the starting circuit (starting switch), and which generates a signal for operating the internal circuit. Thus, regardless of the on/off state of the starting circuit, that is, without turning off the starting circuit, it is possible to make the detection function by the brownout detection circuit effective and detect the brownout state. The internal circuit described here indicates the circuit other than the starting circuit, the brownout detection circuit and the internal power supply circuit.

There are also provided: a timer circuit to which an output of the second comparator for detecting the brownout and an output of the operation start circuit are input, and which measures a predetermined time during which the generation of the brownout state continues; and an output stop circuit which stops outputting of a switching control signal based on an output of the timer circuit. Thus, it is possible to avoid the wrong operation caused by the brownout detection function becoming effective by mistake immediately after the AC power is input.

Furthermore, it is possible to start the operation of the circuit promptly by detecting the rising of the input voltage without using a comparator which needs a reference voltage for the operation start circuit.

Preferably, in the semiconductor device for switching power supply control, the starting circuit includes an operation stop circuit which detects that the voltage of the power supply terminal becomes equal to or less than a predetermined voltage that is lower than the second threshold and which generates a signal for stopping an operation of the internal circuit.

By the above configuration, even in a state in which the voltage of the power supply terminal becomes equal to or less than a predetermined voltage lower than the second threshold of the first comparator and the operation of the internal circuit is stopped, it is possible to make effective the operation of predetermined circuit such as the timer circuit for measuring a predetermined time during which the brownout state continues.

Preferably, the semiconductor device for switching power supply control includes: a first internal power supply circuit which generates a power supply voltage of a circuit forming the starting circuit and the brownout detection circuit based on the voltage of the power supply terminal; and a second internal power supply circuit which generates a power supply voltage of the internal circuit based on the voltage of the power supply terminal, wherein the operation of the internal circuit is stopped by stopping an operation of the second internal power supply circuit with the signal of the operation stop circuit.

By the above configuration, there are provided: a first internal power supply circuit (regulator) which generates a power supply voltage of a circuit forming the starting circuit and the brownout detection circuit; and a second internal power supply circuit (regulator) which generates a power supply voltage of the internal circuit. The operation of the second internal power supply circuit is also stopped in a state in which the operation of the internal circuit is stopped. Thus, it is possible not to consume an electric current in the second internal power supply circuit to reduce the total consumption of electric current when the voltage of the power supply terminal decreases.

Preferably, in the semiconductor device for switching power supply control, the output stop circuit outputs a signal of a first state of stopping the outputting of the switching control signal immediately after the voltage is applied to the current inflow terminal, and the output stop circuit outputs a signal of a second state different from the first state based on the output of the second comparator when the voltage of the current inflow terminal rises and the voltage divided by the voltage divider exceeds the predetermined voltage.

By the above configuration, it is possible not to output the driving pulse of the switching element even in a case where AC power is input in a low AC input state, that is, in the brownout state, the VDD terminal voltage reaches the operation start voltage of IC by the starting circuit and the power supply control IC is started.

Preferably, in the semiconductor device for switching power supply control, the operation start circuit includes: a first resistor and a reverse-direction Zener diode which are connected in series between the power supply terminal and a constant potential point; and a first transistor, a second transistor and a second resistor in series, which are connected in parallel with the first resistor and the reverse-direction Zener diode, and the first transistor is diode-connected, a control terminal of the second transistor is connected to a connection node between the first resistor and the reverse-direction Zener diode, and the signal for operating the internal circuit is taken out from a connection node between the second transistor and the second resistor.

By the above configuration, it is possible to achieve an operation start circuit which detects that the voltage of the power supply terminal becomes a predetermined voltage or more and which generates a signal, by a smaller number of elements than that of a comparator in a general configuration.

Preferably, in the semiconductor device for switching power supply control, the operation start circuit includes: a third transistor which is connected in parallel with the first transistor; and a constant current source and a fourth transistor which are connected in series between the power supply terminal and a constant potential point, a control terminal of the third transistor is connected to a connection node between the constant current source and the fourth transistor, and a control terminal of the fourth transistor is connected to a connection node between the second transistor and the second resistor.

By the above configuration, it is possible to reduce the delay of the control start of the starting circuit by causing a prompt rising of the operation start signal which is the output signal by positive feedback.

According to an aspect of the present invention, in the semiconductor device for control that is included in a switching power supply device which includes a transformer for voltage conversion and controls the output by turning on and off the electric current flowing in the primary-side winding wire, it is possible to make the brownout detection function effective regardless of the on/off state of the starting circuit. It is also possible to make the brownout detection function not effective and prevent wrong operations at the time of inputting of the alternating current power supply, at the time of restarting for returning from the excessive load protecting operation or the like, and at the time of restarting for the change from the brownout to the brown-in. Furthermore, there is an effect that it is possible to start the operation of the circuit promptly by detecting the rising of the input voltage without using a comparator which needs a reference voltage.

Although some embodiments of the present invention have been described and illustrated in detail, the disclosed embodiments are made for purposes of not limitation but illustration and example only. The scope of the present invention should be interpreted by terms of the appended claims.

What is claimed is:

1. A semiconductor device for switching power supply control comprising:
   a power supply terminal to which a voltage obtained by smoothing an induced voltage with an external capacitor is input, the induced voltage being a voltage induced in an auxiliary winding wire of a transformer which includes the auxiliary winding wire and in which a voltage obtained by rectifying an alternating current voltage is applied to a primary-side winding wire;
   a current inflow terminal to which the voltage obtained by rectifying the alternating current voltage is input via a resistor;
   a starting circuit which allows an electric current to flow to the power supply terminal via a switch and charges the capacitor, the switch being connected between the current inflow terminal and the power supply terminal; and
   a brownout detection circuit which is connected to the current inflow terminal and detects brownout, wherein
   a control signal of a switching element that is connected in series with the primary-side winding wire of the transformer is generated,
   the starting circuit includes:
      a first comparator to which a voltage of the power supply terminal is input and which has a first threshold and a second threshold that is lower than the first threshold;
      a starting control circuit which controls on and off of the switch based on an output of the first comparator; and
      an operation start circuit which detects that the voltage of the power supply terminal becomes equal to or more than a predetermined voltage that is higher than the first threshold without using a voltage to be compared, and which generates a signal for operating an internal circuit, and
   the brownout detection circuit includes:
      a voltage divider which divides a voltage of the current inflow terminal;
      a second comparator which has a hysteresis characteristic for detecting generation of a brownout state by comparing the voltage divided by the voltage divider and a predetermined voltage;
      a timer circuit to which an output of the second comparator and an output of the operation start circuit are input, and which measures a predetermined time during which the generation of the brownout state continues; and
      an output stop circuit which stops outputting of a switching control signal based on an output of the timer circuit.

2. The semiconductor device for switching power supply control according to claim 1, wherein the starting circuit includes an operation stop circuit which detects that the voltage of the power supply terminal becomes equal to or less than a predetermined voltage that is lower than the second threshold and which generates a signal for stopping an operation of the internal circuit.

3. The semiconductor device for switching power supply control according to claim 2, comprising:
   a first internal power supply circuit which generates a power supply voltage of a circuit forming the starting circuit and the brownout detection circuit based on the voltage of the power supply terminal; and
   a second internal power supply circuit which generates a power supply voltage of the internal circuit based on the voltage of the power supply terminal, wherein the operation of the internal circuit is stopped by stopping an operation of the second internal power supply circuit with the signal of the operation stop circuit.

4. The semiconductor device for switching power supply control according to claim 1, wherein
the output stop circuit outputs a signal of a first state of stopping the outputting of the switching control signal immediately after the voltage is applied to the current inflow terminal, and
the output stop circuit outputs a signal of a second state different from the first state based on the output of the second comparator when the voltage of the current inflow terminal rises and the voltage divided by the voltage divider exceeds the predetermined voltage.

5. The semiconductor device for switching power supply control according to claim 1, wherein
the operation start circuit includes: a first resistor and a reverse-direction Zener diode which are connected in series between the power supply terminal and a constant potential point; and a first transistor, a second transistor and a second resistor in series, which are connected in parallel with the first resistor and the reverse-direction Zener diode, and
the first transistor is diode-connected, a control terminal of the second transistor is connected to a connection node between the first resistor and the reverse-direction Zener diode, and the signal for operating the internal circuit is taken out from a connection node between the second transistor and the second resistor.

6. The semiconductor device for switching power supply control according to claim 5, wherein
the operation start circuit includes: a third transistor which is connected in parallel with the first transistor; and a constant current source and a fourth transistor which are connected in series between the power supply terminal and a constant potential point,
a control terminal of the third transistor is connected to a connection node between the constant current source and the fourth transistor, and
a control terminal of the fourth transistor is connected to a connection node between the second transistor and the second resistor.

7. An AC-DC converter comprising:
the semiconductor device for switching power supply control according to claim 1;
a transformer which includes an auxiliary winding wire and in which a voltage obtained by rectifying an alternating current voltage is applied to a primary-side winding wire; and
a switching element which is connected to the primary-side winding wire, wherein
the switching element is controlled by using the semiconductor device for switching power supply control.

* * * * *